(12) United States Patent
Werries et al.

(10) Patent No.: US 11,306,560 B2
(45) Date of Patent: Apr. 19, 2022

(54) APPARATUS, SYSTEMS AND METHODS FOR ISOLATION DURING MULTISTAGE HYDRAULIC FRACTURING

(71) Applicant: NCS MULTISTAGE INC., Calgary (CA)

(72) Inventors: Michael Werries, Calgary (CA); Brock Gillis, Calgary (CA); Tim Johnson, Calgary (CA); Ramin Tajallipour, Calgary (CA)

(73) Assignee: NCS Multistage Inc., Calgary (CA)

( * ) Notice: Subject to any disclaimer, the term of this patent is extended or adjusted under 35 U.S.C. 154(b) by 138 days.

(21) Appl. No.: 16/345,647

(22) PCT Filed: Oct. 27, 2017

(86) PCT No.: PCT/CA2017/051286
§ 371 (c)(1),
(2) Date: Apr. 26, 2019

(87) PCT Pub. No.: WO2018/076119
PCT Pub. Date: May 3, 2018

(65) Prior Publication Data
US 2019/0284904 A1    Sep. 19, 2019

Related U.S. Application Data

(60) Provisional application No. 62/512,470, filed on May 30, 2017, provisional application No. 62/414,354, filed on Oct. 28, 2016.

(51) Int. Cl.
*E21B 34/10*   (2006.01)
*E21B 34/06*   (2006.01)
(Continued)

(52) U.S. Cl.
CPC ............ *E21B 34/10* (2013.01); *E21B 34/063* (2013.01); *E21B 34/14* (2013.01); *G05D 7/0133* (2013.01);
(Continued)

(58) Field of Classification Search
CPC ........ E21B 34/10; E21B 34/14; E21B 34/063; E21B 2200/06; E21B 43/26; G05D 7/0133; G05D 7/0635
(Continued)

(56) References Cited

U.S. PATENT DOCUMENTS 10,119,365 B2 *  11/2018  Sanchez ................. E21B 34/14
2011/0000679 A1 *  1/2011  Joseph .................... F04B 47/02
166/373
(Continued)

OTHER PUBLICATIONS

Extended European Search Report; EP 17865637.7 dated May 7, 2020.

(Continued)

*Primary Examiner* — Matthew R Buck
*Assistant Examiner* — Patrick F Lambe
(74) *Attorney, Agent, or Firm* — Ridout & Maybee LLP

(57) ABSTRACT

A flow control apparatus is provided comprising: a housing including a port; a housing passage disposed within the housing; a flow control member, displaceable, relative to the port, for effecting opening of the port; and a co-operating member. The flow control member and the co-operating member are co-operatively configured such that displacement of the flow control member, relative to the port, is with effect that a force is applied by the flow control member to the co-operating member, with effect that a seating surface is obtained for receiving a flow communication interference body that is being conducted through the housing passage. The seating surface is obtained in response to a deformation effected by the applied force.

34 Claims, 18 Drawing Sheets

(51) Int. Cl.
*G05D 7/06* (2006.01)
*E21B 34/14* (2006.01)
*G05D 7/01* (2006.01)
*E21B 43/26* (2006.01)

(52) U.S. Cl.
CPC ............ G05D 7/0635 (2013.01); *E21B 43/26* (2013.01); *E21B 2200/06* (2020.05)

(58) Field of Classification Search
USPC ........................................................ 166/317
See application file for complete search history.

(56) References Cited

U.S. PATENT DOCUMENTS

| | | |
|---|---|---|
| 2012/0199341 A1 | 8/2012 | Kellner et al. |
| 2015/0167431 A1 | 6/2015 | Purkis et al. |
| 2016/0265310 A1* | 9/2016 | Getzlaf ................ E21B 34/063 |
| 2018/0128081 A1* | 5/2018 | Stromquist ........... E21B 34/063 |
| 2019/0085674 A1* | 3/2019 | Frosell ................... E21B 43/26 |
| 2019/0153813 A1* | 5/2019 | Campbell ............... E21B 23/02 |

OTHER PUBLICATIONS

International Search Report and Written Opinion; PCT/CA2017/051286 dated Jan. 26, 2018.

* cited by examiner

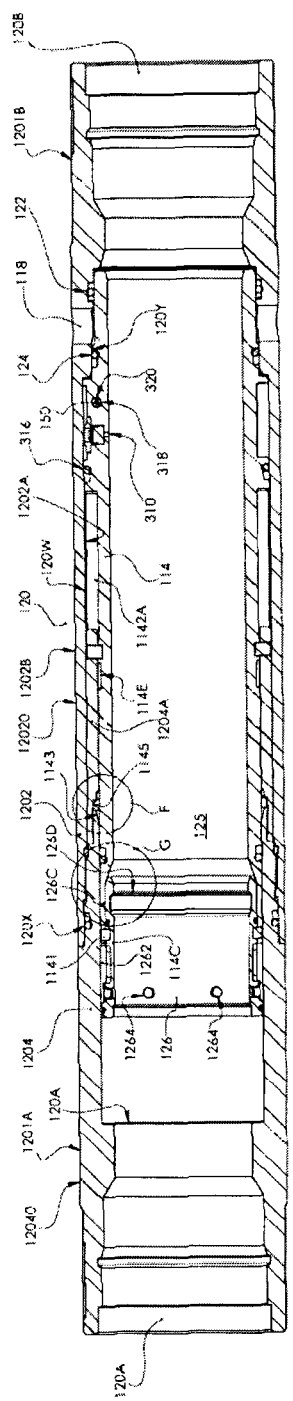
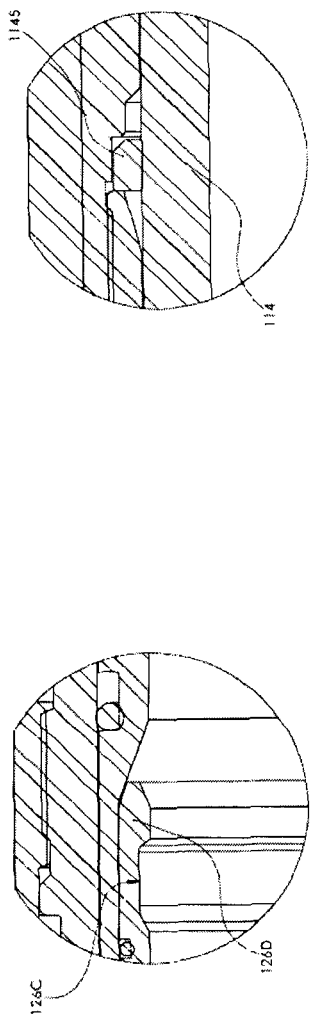
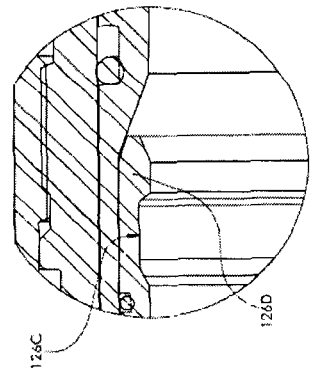
FIG. 8
FIG. 9
FIG. 10

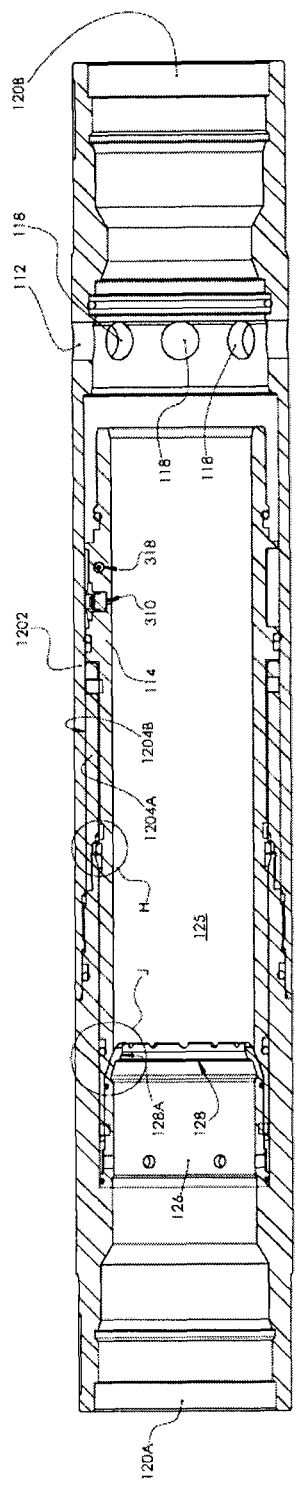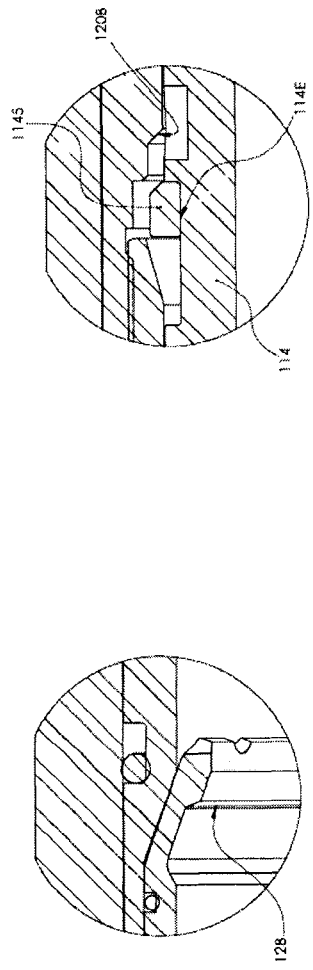

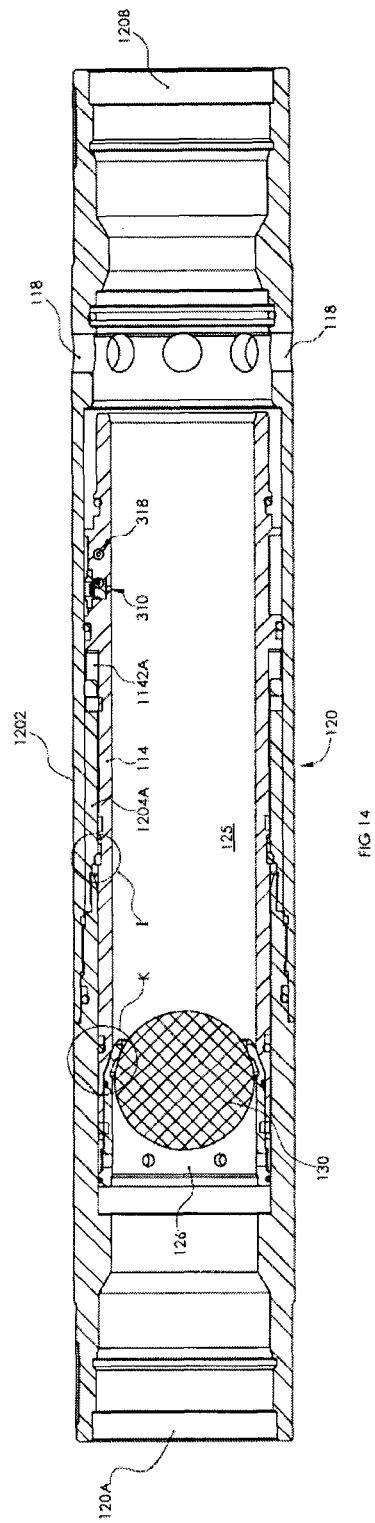
FIG 14
FIG 16
FIG 15

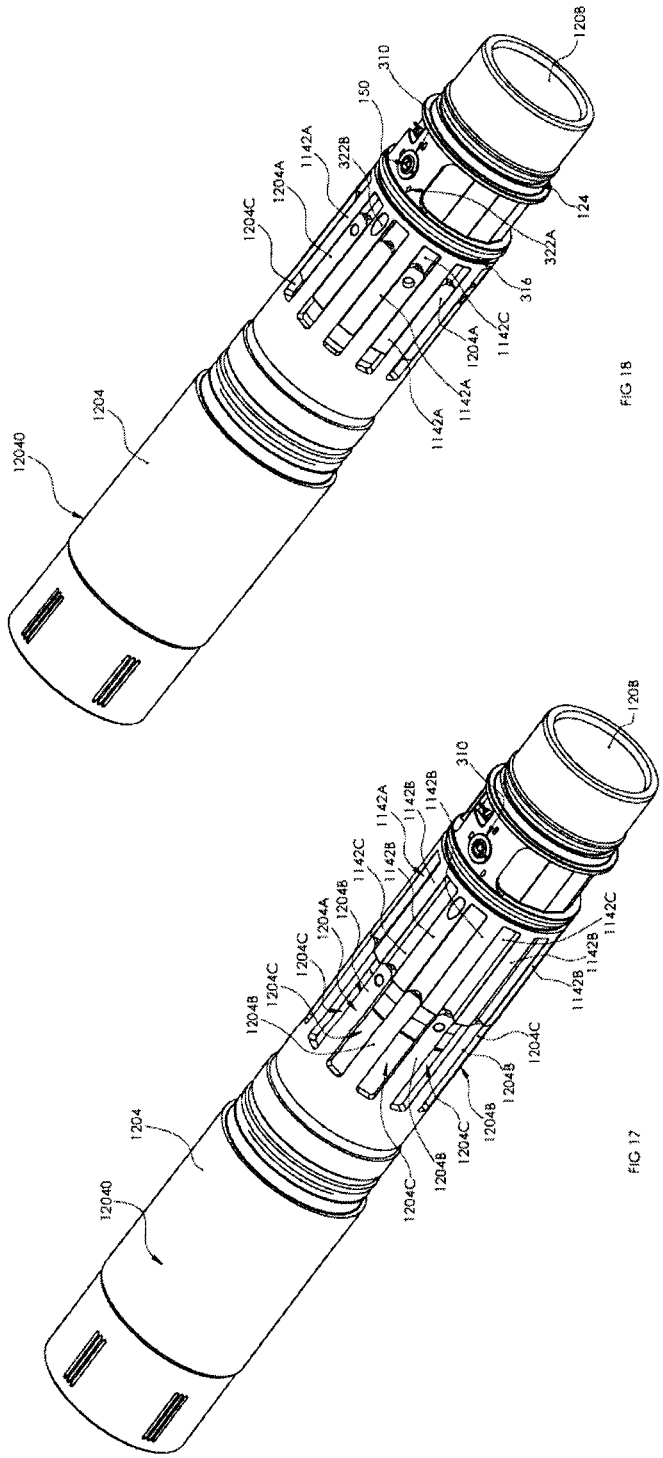

APPARATUS, SYSTEMS AND METHODS FOR ISOLATION DURING MULTISTAGE HYDRAULIC FRACTURING

FIELD

The present disclosure relates to obtaining confirmation of a wellbore operation.

BACKGROUND

The number of stages accessible for hydraulic fracturing is generally limited due to mechanical limitations of existing technologies. Challenges exist with providing reliable isolation of previously fracked stages.

SUMMARY

In one aspect, there is provided a flow control apparatus comprising: a housing including a port; a housing passage disposed within the housing; a flow control member, displaceable, relative to the port, for effecting opening of the port; and a co-operating member; wherein the flow control member and the co-operating member are co-operatively configured such that displacement of the flow control member, relative to the port, is with effect that a force is applied by the flow control member to the co-operating member, with effect that a seating surface is obtained for receiving a flow communication interference body that is being conducted through the housing passage; and the seating surface is obtained in response to a deformation effected by the applied force.

In another aspect, there is provided a flow control apparatus comprising a housing including a port; a housing passage disposed within the housing; a flow control member, displaceable, relative to the port, for effecting opening of the port; and a co-operating member co-operatively configured with the flow control member such that displacement of the flow control member, relative to the port, is with effect that a force is applied by the flow control member to the co-operating member to deform one of the flow control member and the co-operating member, with effect that a seat, including a seating surface, is obtained for receiving a flow communication interference body, that is being conducted through the housing passage, in a seated condition.

In yet a further aspect, there is provided a flow control apparatus comprising:
a housing including an inlet and a port
a housing passage disposed within the housing;
a flow control member, displaceable, relative to the port, from a closed position to an open position, wherein, in the closed position, the flow control member covers the port, and in the open position, the flow control member is disposed relative to the port such that the port is uncovered; wherein:
the housing includes a first housing portion and a second housing portion, wherein the first housing portion partially overlaps with the second housing portion;
the first housing portion includes:
an inner surface disposed in fluid pressure communication with the housing passage; and
an outermost surface disposed, relative to the inner surface, on an opposite side of the first housing portion for communicating with a subterranean formation;
a plurality of spaced apart first support members extending from the second housing portion, wherein each one of the first support members, independently, includes a respective first support surface;
each pair of adjacent ones of the plurality of spaced apart first support members, independently, define a receiving space therebetween, such that at least one receiving space is provided;
at least one second support member extending from the flow control member in an outwardly direction relative to the central longitudinal axis of the housing passage, wherein each one of the at least one second support member, independently, includes a respective second support surface;
the first housing portion, the second housing portion, the flow control member and the port are co-operatively configured such that:
for each one of the plurality of spaced apart first support members, independently, the respective first support surface is opposing the first housing portion; and
while the flow control member is disposed in the closed position, for each one of the at least one second support member, independently, the respective second support surface is opposing the first housing portion;
and
the at least one second support member and the at least one receiving space being co-operatively configured such that the displacement of the flow control member from the closed position to the open position is with effect that each one of the at least one second support member is received within a corresponding one of the at least one receiving space.

In yet a further aspect, there is provided a flow control apparatus comprising:
a housing including an inlet and a port
a housing passage disposed within the housing;
a flow control member, displaceable, relative to the port, from a closed position to an open position, wherein, in the closed position, the flow control member covers the port, and in the open position, the flow control member is disposed relative to the port such that the port is uncovered; wherein:
the housing includes a first housing portion and a second housing portion, wherein the first housing portion partially overlaps the second housing portion;
the first housing portion includes:
an inner surface disposed in fluid pressure communication with the housing passage; and
an outermost surface disposed, relative to the inner surface, on an opposite side of the first housing portion, for communicating with a subterranean formation;
a plurality of spaced apart first support members extending from the second housing portion, wherein each one of the first support members, independently, includes a respective first support surface;
each pair of adjacent ones of the plurality of spaced apart first support members, independently, define a receiving space therebetween, such that at least one receiving space is provided;
at least one second support member extending from the flow control member in an outwardly direction relative to the central longitudinal axis of the housing passage, wherein each one of the at least one second support member, independently, includes a respective second support surface;
the first housing portion, the second housing portion, the flow control member and the port are co-operatively configured such that:
for each one of the plurality of spaced apart first support members, independently, the respective first support surface is opposing the first housing portion; and
while the flow control member is disposed in the closed position, for each one of the at least one second support member, independently, the respective second support surface is opposing the first housing portion; and the displacement of the flow control member from the closed position to the open position effects at least partial nesting of the at least one second support member with the plurality of spaced apart first support members.

In yet a further aspect, there is provided a flow control apparatus comprising:
a housing including an inlet and a port
a housing passage disposed within the housing;
a flow control member, displaceable, relative to the port, from a closed position to an open position, wherein, in the closed position, the flow control member covers the port, and in the open position, the flow control member is disposed relative to the port such that the port is uncovered; wherein:

the housing includes a first housing portion and a second housing portion, wherein the first housing portion partially overlaps with the second housing portion;

the first housing portion includes:
an inner surface disposed in fluid pressure communication with the housing passage; and
an outermost surface disposed, relative to the inner surface, on an opposite side of the first housing portion for communicating with a subterranean formation;

a plurality of support members extending from the flow control member in an outwardly direction relative to the central longitudinal axis of the housing passage, wherein each one of the support members, independently, includes a respective support surface;

the first housing portion, the second housing portion, the flow control member and the one or more ports are co-operatively configured such that:
at least a portion of the second housing portion is opposing the first housing portion; and
while the flow control member is disposed in the closed position, for each one of the support members, independently, the respective support surface is opposing the first housing portion;
and
the support members and the second housing portion being co-operatively configured such that the displacement of the flow control member from the closed position to the open position is with effect that the support members become at least partially nested within the second housing portion.

In yet a further aspect, there is provided a flow control apparatus comprising: a housing including a port; a housing passage disposed within the housing; a flow control member that is displaceable relative to the port and includes a fluid responsive surface; an actuating fluid communicating passage; a sealed interface effecting sealing of the actuating fluid communication passage; a compartment disposed relative to the fluid responsive surface such that, while fluid is disposed within the compartment, fluid pressure is applied to the fluid responsive surface by fluid disposed within the compartment; a bleed passage disposed in flow communication with the compartment for effecting discharge of fluid from the compartment; wherein: the compartment, the actuating fluid communicating passage, and the housing passage are co-operatively configured such that defeating of the sealed interface is with effect that flow communication between the housing passage and the compartment, via the actuating fluid communicating passage, is established, and fluid disposed within the housing passage is communicated to the compartment; and the bleed passage and the actuating fluid communication passage are co-operatively configured such that while the sealed interface is defeated such that flow communication between the housing passage and the compartment, via the actuating fluid passage, is established, and fluid disposed within the housing passage is communicated to the compartment, discharging, via the bleed passage, of the communicated fluid, that has accumulated within the compartment, is insufficient to prevent the accumulated fluid from becoming disposed at a sufficient pressure to act on the fluid pressure responsive surface with effect that the flow control member is displaced, relative to the port, for effecting opening of the port.

In yet a further aspect, there is provided a flow control apparatus comprising: a housing including a port; a housing passage disposed within the housing; a flow control member, displaceable relative to the port, and including a fluid responsive surface; an actuating fluid communicating passage; a first sealed interface effecting sealing of the actuating fluid communication passage; a compartment disposed relative to the fluid responsive surface such that, while fluid is disposed within the compartment, fluid pressure is applied to the fluid responsive surface by fluid disposed within the compartment; a leakage-susceptible-passage disposed between the housing passage and the compartment; a second sealed interface effecting sealing of the leakage susceptible passage; a bleed passage disposed in flow communication with the compartment for effecting discharge of fluid from the compartment; wherein: the compartment, the actuating fluid communicating passage, and the housing passage and are co-operatively configured such that defeating of the first sealed interface is with effect that flow communication between the housing passage and the compartment, via the actuating fluid communicating passage, is established, and fluid being conducted through the housing passage is communicated to the compartment; the compartment, the leakage-susceptible passage, and the housing passage are co-operatively configured such that, while fluid that is being conducted through the housing passage is leaking though the leakage-susceptible passage, the leaking fluid is communicated to the compartment; and the bleed passage, the actuating fluid communication passage, and the leakage susceptible passage are co-operatively configured such that: while the first sealed interface is defeated such that flow communication between the housing passage and the compartment, via the actuating fluid communicating passage, is established, and fluid being conducted through the housing passage is communicated to the compartment, the communicated fluid is accumulated within the compartment such that the fluid within the compartment is disposed at a sufficient pressure to act on the fluid pressure responsive surface with effect that the flow control member is displaced, relative to the port, for effecting opening of the port; and while: (i) fluid is being conducted through the housing passage, (ii) the conducted fluid is leaking though the leakage-susceptible passage and communicated to the compartment, and (iii) the first sealed interface is sealing communication between the housing passage and the compartment, via the actuating fluid communication passage, the fluid in the compartment is discharged at a sufficient rate via the bleed passage such that fluid within the compartment is disposed at an insufficient pressure to act on the fluid pressure responsive surface, with effect that the flow control member remains disposed in the closed position.

In a further aspect, a flow control apparatus is provided comprising: a housing including a port; a housing passage disposed within the housing; an actuator moveable within the housing passage; and a co-operating member; wherein:

the actuator and the co-operating member are co-operatively configured such that displacement of the actuator is with effect that that contact engagement is effected between the actuator and the co-operating member, with effect that a force is applied by the actuator to the co-operating member, with effect that a seating surface is obtained for receiving a flow communication interference body that is being conducted through the housing passage.

In another aspect, there is provided a process for stimulating a subterranean formation comprising: obtaining a seating surface, within a wellbore, by a deformation in response to displacement of a flow control member, relative to one or more ports of a downhole-disposed flow communication station, in the uphole direction; after the obtaining of the seating surface, deploying a flow communication-interference body within the wellbore such that the flow communication-interference body becomes seated on the obtained seating surface for obstructing flow communication between an uphole-disposed flow communication station and the downhole-disposed flow communication station, wherein the uphole-disposed flow communication station is disposed uphole relative to the downhole-disposed flow communication station; and while: (i) the flow communication-interference body is seated on the obtained seating surface for obstructing flow communication between the uphole-disposed flow communication station and the downhole-disposed flow communication station, and (ii) one or more ports of the uphole-disposed flow communication station are disposed in an opened condition for effecting flow communication between the subterranean formation and the wellbore via the uphole-disposed flow communication station, injecting stimulation fluid into the subterranean formation via the opened one or more ports of the uphole-disposed flow communication station.

In a further aspect, there is provided a process for stimulating a subterranean formation comprising: obtaining a seating surface, within a wellbore, by a deformation in response to displacement of a flow control member, relative to one or more ports of an uphole-disposed flow communication station, in the downhole direction, wherein the displacement of the flow control member, relative to the one or more ports of the uphole-disposed flow communication station, effects opening of the one or more ports of the uphole-disposed flow communication station; after the obtaining of the seating surface, deploying a flow communication-interference body within the wellbore such that the flow communication-interference body becomes seated on the obtained seating surface for obstructing flow communication between the uphole-disposed flow communication station and a downhole-disposed flow communication station, wherein the uphole-disposed flow communication station is disposed uphole relative to the downhole-disposed flow communication station; and while: (i) the one or more ports of the uphole-disposed flow communication station are disposed in an opened condition for effecting flow communication between the subterranean formation and the wellbore via the uphole-disposed flow communication station, and (ii) the flow communication-interference body is seated on the obtained seating surface for obstructing flow communication between the uphole-disposed flow communication station and the downhole-disposed flow communication station, injecting stimulation fluid into the subterranean formation via the opened one or more ports of the uphole-disposed flow communication station.

BRIEF DESCRIPTION OF DRAWINGS

The preferred embodiments will now be described with the following accompanying drawings, in which:

FIG. 8 is a side sectional view of another embodiment of a flow control apparatus for use in the system illustrated in FIG. 1, illustrating the ports in the closed condition;

FIG. 9 is an enlarged view of Detail "G" in FIG. 8, illustrating the interaction between the flow control member and the co-operating member while the ports are disposed in the closed condition;

FIG. 10 is an enlarged view of Detail "F" in FIG. 8, illustrating the disposition of the retaining ring relative to the housing and the flow control member;

FIG. 11 is a side sectional view of the flow control apparatus illustrated in FIG. 8, illustrating the ports in the opened condition, and with the sleeve having been displaced and deformed to obtain a seating surface for receiving a ball;

FIG. 12 is an enlarged view of Detail "J" in FIG. 11, illustrating the deformation of the co-operating member by the flow control member to obtain a seating surface;

FIG. 13 is an enlarged view of Detail "H" in FIG. 11, illustrating the change in disposition of the retaining ring upon alignment with the recess of the flow control member;

FIG. 14 is a side sectional view of the flow control apparatus illustrated in FIG. 8, illustrating the ports in the opened condition and with a ball having been landed on the seating surface produced by the deformation;

FIG. 15 is an enlarged view of Detail "K" in FIG. 14, illustrating the landing of the ball on the obtained seating surface;

FIG. 16 is an enlarged view of Detail "I" in FIG. 14, illustrating the retention of the flow control member, relative to the housing, by the retaining ring, for preventing re-closing of the ports;

FIG. 17 is a top perspective view of the flow control apparatus illustrated in FIG. 8 with the lower sub having been removed for clarity, with the flow control member disposed in the closed position;

FIG. 18 is a top perspective view of the flow control apparatus illustrated in FIG. 8 with the lower sub having been removed for clarity, with the flow control member disposed in the open position;

DETAILED DESCRIPTION

Figure 1:
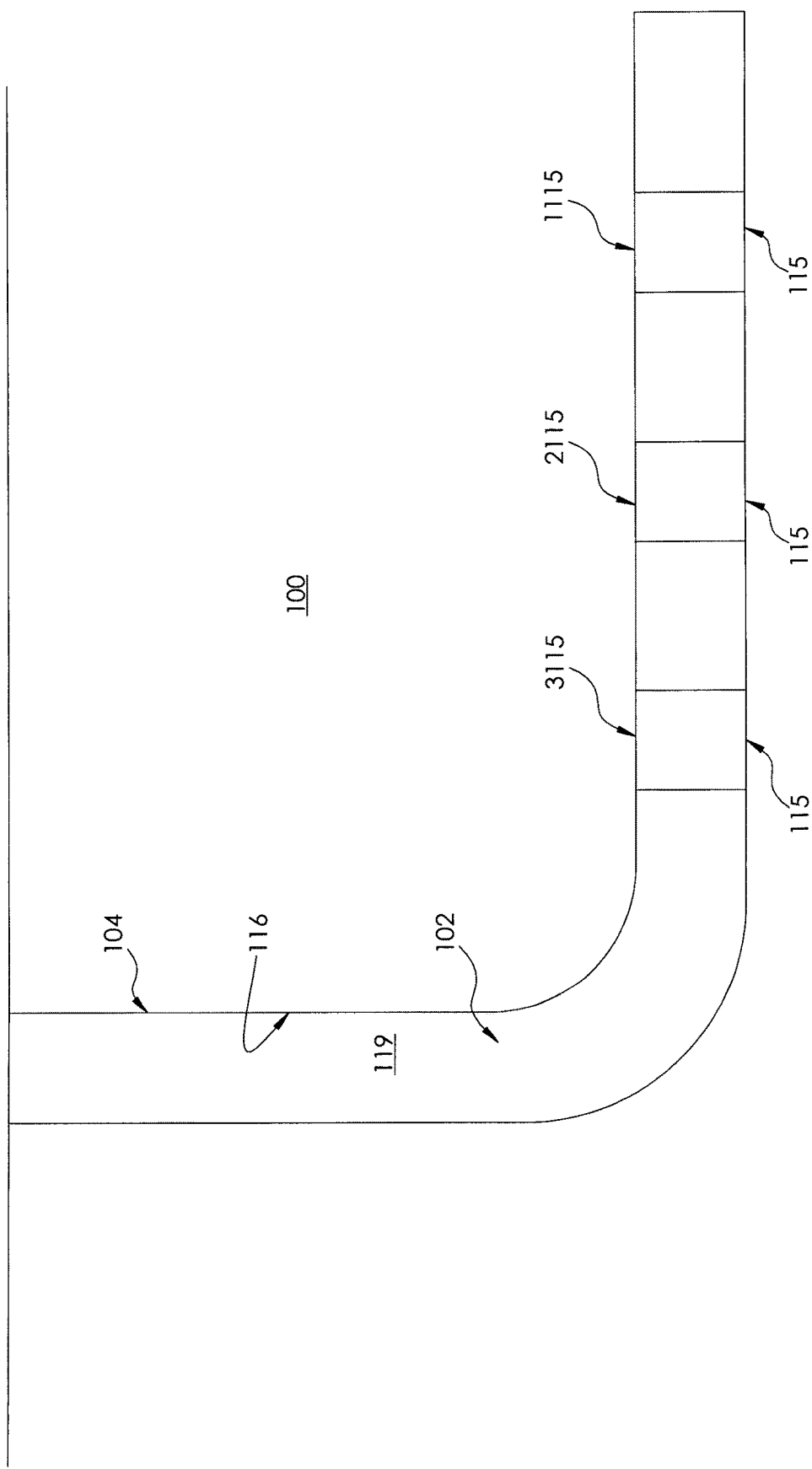
FIG. 1 is a schematic illustration of a system for effecting fluid communication between the surface and a subterranean formation via a wellbore.

Referring to FIG. 1, there is provided a wellbore material transfer system 104 for conducting material from the surface 10 to a subterranean formation 100 via a wellbore 102, from the subterranean formation 100 to the surface 10 via the wellbore 102, or between the surface 10 and the subterranean formation 100 via the wellbore 102. In some embodiments, for example, the subterranean formation 100 is a hydrocarbon material-containing reservoir.

In some embodiments, for example, the conducting (such as, for example, by flowing) stimulation material to the subterranean formation 100 via the wellbore 102 is for effecting selective stimulation of a hydrocarbon material-containing reservoir. The stimulation is effected by supplying stimulation material to the hydrocarbon material-containing reservoir. In some embodiments, for example, the stimulation material is a liquid including water. In some embodiments, for example, the liquid includes water and chemical additives. In other embodiments, for example, the stimulation material is a slurry including water, proppant, and chemical additives. Exemplary chemical additives include acids, sodium chloride, polyacrylamide, ethylene glycol, borate salts, sodium and potassium carbonates, glutaraldehyde, guar gum and other water soluble gels, citric acid, and isopropanol. In some embodiments, for example, the stimulation material is supplied to effect hydraulic fracturing of the reservoir. In some embodiments, for example, the stimulation material includes water, and is supplied to effect waterflooding of the reservoir.

In some embodiments, for example, the conducting (such as, for example, by flowing) material from the subterranean formation 100 to the surface 10 via the wellbore 102 is for effecting production of hydrocarbon material from the hydrocarbon material-containing reservoir. In some of these embodiments, for example, the hydrocarbon material-containing reservoir, whose hydrocarbon material is being produced by the conducting via the wellbore 102, has been, prior to the producing, stimulated by the supplying of treatment material to the hydrocarbon material-containing reservoir.

In some embodiments, for example, the conducting to the subterranean formation 100 from the surface 10 via the wellbore 102, or from the subterranean formation 100 to the surface 10 via the wellbore 102, is effected via one or more flow communication stations 115 that are disposed at the interface between the subterranean formation 100 and the wellbore 102. In some embodiments, for example, the flow communication stations 115 are integrated within a wellbore string 116 that is deployed within the wellbore 102. Integration may be effected, for example, by way of threading or welding.

The wellbore string 116 includes one or more of pipe, casing, and liner, and may also include various forms of tubular segments, such as the flow control apparatuses 115A described herein. The wellbore string 116 defines a wellbore string passage 119 for effecting conduction of fluids between the surface 10 and the subterranean formation 100. In some embodiments, for example, the flow communication station 115 is integratable within the wellbore string 116 by a threaded connection.

Successive flow communication stations 115 may be spaced from each other along the wellbore string 116 such that each flow communication stations 115 is positioned adjacent a zone or interval of the subterranean formation 100 for effecting flow communication between the wellbore 102 and the zone (or interval).

For effecting the flow communication, the flow communication station 115 includes a flow control apparatus 115A. Referring to FIGS. 2 to 7, the flow control apparatus 115A includes one or more ports 118 through which the conducting of the material is effected. The ports 118 are disposed within a sub that has been integrated within the wellbore string 116, and are pre-existing, in that the ports 118 exist before the sub, along with the wellbore string 116, has been installed downhole within the wellbore string 116.

The flow control apparatus 115A includes a flow control member 114 for controlling the conducting of material by the flow control apparatus 115A via the one or more ports 118. The flow control member 114 is displaceable, relative to the one or more ports 118, for effecting opening of the one or more ports 118. In some embodiments, for example, the flow control member 114 is also displaceable, relative to the one or more ports 118, for effecting closing of the one or more ports 118. In this respect, the flow control member 114 is displaceable from a closed position (see FIGS. 2, 5, and 8) to an open position (see FIGS. 3, 6, and 9). The open position of the flow control member 114 corresponds to an open condition of the one or more ports 118. The closed position of the flow control member 114 corresponds to a closed condition of the one or more ports 118.

In some embodiments, for example, the flow control member 114 is displaceable mechanically, such as, for example, with a shifting tool. In some embodiments, for example, the flow control member 114 is displaceable hydraulically, such as, for example, by communicating pressurized fluid via the wellbore to urge the displacement of the flow control member 14. In some embodiments, for example, the flow control member 114 is integrated within a flow control apparatus which includes a trigger for effecting displacement of the flow control member 114 hydraulically in response to receiving of a signal transmitted from the surface 10.

In some embodiments, for example, in the closed position (see FIGS. 2 and 5), the one or more ports 118 are covered by the flow control member 114, and the displacement of the flow control member 114 to the open position (see FIGS. 3 and 6) effects at least a partial uncovering of the one or more ports 118 such that the one or more ports 118 become disposed in the open condition. In some embodiments, for example, in the closed position, the flow control member 114 is disposed, relative to the one or more ports 118, such that a sealed interface is disposed between the wellbore string 116 and the subterranean formation 100, and the disposition of the sealed interface is such that the conduction of material between the wellbore string 116 and the subterranean formation 100, via the flow communication station 115 is prevented, or substantially prevented, and displacement of the flow control member 114 to the open position effects flow communication, via the one or more ports 118, between the wellbore string 116 and the subterranean formation 100, such that the conducting of material between the wellbore string 116 and the subterranean formation 100, via the flow communication station, is enabled. In some embodiments, for example, the sealed interface is established by sealing engagement between the flow control member 114 and the wellbore string 116. In some embodiments, for example, the flow control member 114 includes a sleeve. The sleeve is slideably disposed within the wellbore string passage 119.

In some embodiments, for example, the flow control apparatus 115A includes a housing 120. The housing 120 includes an upper sub 1201A and a lower sub 1201B. The housing 120 includes one or more sealing surfaces configured for sealing engagement with a flow control member 114, wherein the sealing engagement defines the sealed interface described above. In some embodiments, for example, the flow control member 114 includes a sliding sleeve. In this respect, sealing surfaces 122, 124 are defined on an internal surface of the housing 120 for sealing engagement with the flow control member 114. In some embodiments, for example, each one of the sealing surfaces 122, 124 is defined by a respective sealing member. In some embodiments, for example, each one of the sealing members, independently, includes an o-ring. In some embodiments, for example, the o-ring is housed within a recess formed within the housing 120. In some embodiments, for example, the sealing member includes a molded sealing member (i.e. a sealing member that is fitted within, and/or bonded to, a groove formed within the sub that receives the sealing member). In some embodiments, for example, the one or more ports 118 extend through the housing 120, and are disposed between the sealing surfaces 122, 124.

The housing 120 includes a housing passage 125 which forms a portion of the wellbore string passage 119 for effecting material transfer between the surface 10 and the subterranean formation 100. In this respect, material transfer between the housing passage 125 and the subterranean formation 100 is effected via the one or more ports 118. The housing 120 includes an inlet 120A and an outlet 120B. The inlet 120A fluidly communicates with the outlet 120B via the housing passage 125.

The flow control member 114 co-operates with the sealing members 122, 124 to effect opening and closing of the one or more ports 118. In some embodiments, for example, when the one or more ports 118 is disposed in the closed condition, the flow control member 114 is sealingly engaged to both of the sealing members 122, 124, thereby preventing, or substantially preventing, treatment material, being supplied through the wellbore string passage 119 (including the housing passage 125) from being injected into the subterranean formation 100 via the one or more ports 118. When the one or more ports 118 is disposed in the open condition, the flow control member 114 is spaced apart or retracted from at least one of the sealing members thereby providing a passage for stimulation material, being supplied through the wellbore string passage 119, to be injected into the subterranean formation 100 via the one or more ports 118.

A force may be, independently, applied to the flow control member 114 mechanically, hydraulically, or a combination thereof. In some embodiments, for example, the applied force is a mechanical force, and such force is applied by a shifting tool of a workstring. In some embodiments, for example, the applied force is hydraulic, and is applied by communicating pressurized fluid via the wellbore to a fluid responsive surface 140 of the flow control member 114, to urge the displacement of the flow control member 114. In some embodiments, for example, the flow control member 114 is integrated within a flow control apparatus 115A which includes a trigger for effecting displacement of the flow control member 114 in response to sensing (for example, by a sensor 150) of a signal transmitted from the surface 10 (see below).

In some embodiments, for example, while the flow control apparatus 115A is being deployed downhole with the wellbore string 116, the flow control member 114 is disposed in the closed position, over the ports, by one or more frangible members 134 (such as, for example, one or more shear pins), and is thereby restricted from displacement relative to the one or more ports 118. The one or more frangible members are provided to secure the flow control member 114 to the wellbore string 116 (including while the wellbore string is being installed downhole) so that the passage 119 is maintained fluidically isolated from the formation 100 until it is desired to treat the formation 100 with treatment material. To effect the initial displacement of the flow control member 114 from the closed position to the open position, sufficient force must first be applied to the one or more frangible members such that the one or more frangible members become fractured (such as, for example, sheared), resulting in the flow control member 114 becoming moveable relative to the one or more ports 118. In some operational implementations, the force that effects the fracturing (e.g. shearing) is applied by a workstring.

Alternatively, in some embodiments, for example, the flow control member 114 can be maintained in the closed position over the ports by being disposed in press fit engagement with the housing 120.

The flow control apparatus 115A also includes a co-operating member 126 configured to become disposed in contact engagement with the flow control member 114 upon displacement of the flow control member relative to the one or more ports 118.

Referring to FIGS. 2 to 7, in one aspect, the flow control member 114 and the co-operating member 126 are co-operatively configured such that contact engagement of the flow control member 114 with the co-operating member 126 in response to displacement of the flow control member 114 relative to the one or more ports 118, with effect that a seat 128, including a seating surface 128A, is obtained by deformation of at least a portion of either one of the flow control member 114 or the co-operating member 126. In some embodiments, for example, the contact engagement effects deformation of one of the flow control member 114 and the co-operating member 126, and the obtaining of the seating surface 128A is effected by the deformation. In some embodiments, for example, the deformation is a plastic deformation. In some embodiments, for example, the deformation is an elastic deformation.

Again referring to FIGS. 2 to 20, in another aspect, the flow control member 114 is displaceable, relative to the one or more ports 118, along a path 130 for effecting opening of the one or more ports 118. Co-operatively, the co-operating member 126 is disposed within the path 129 for interfering with the displacement of the flow control member 114, with effect that the seating surface 128A is obtained by the interference. In some embodiments, for example, the interference effects deformation of one of the flow control member 114 and the co-operating member 126, and the obtaining of the seating surface 128A is effected by the deformation.

Figure 2:
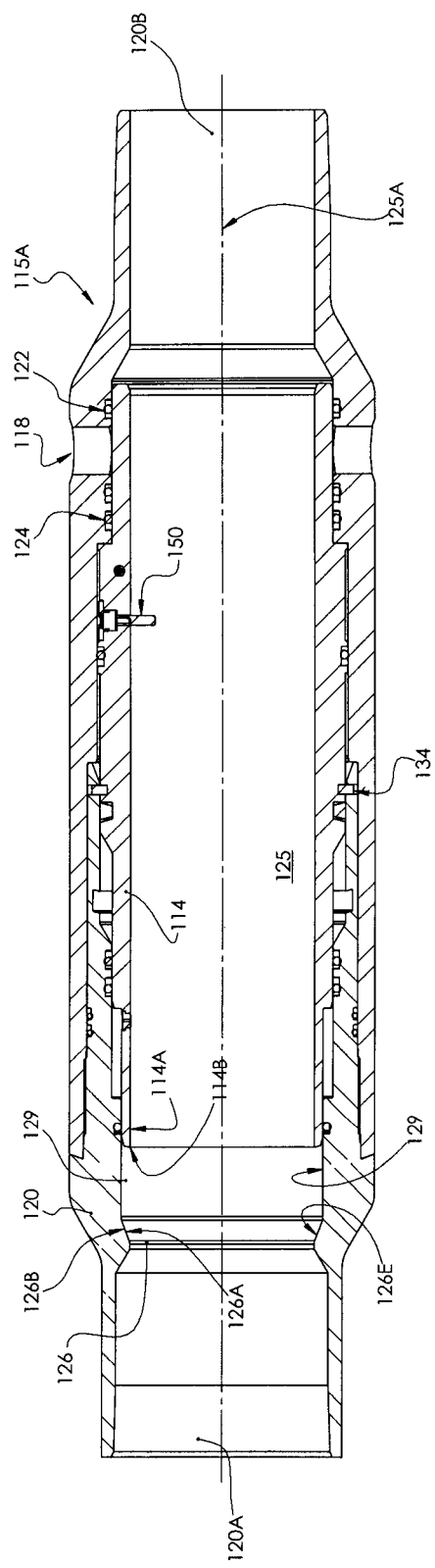
FIG. 2 is a side sectional view of an embodiment of a flow control apparatus for use in the system illustrated in FIG. 1, illustrating the ports in the closed condition.
Figure 3:
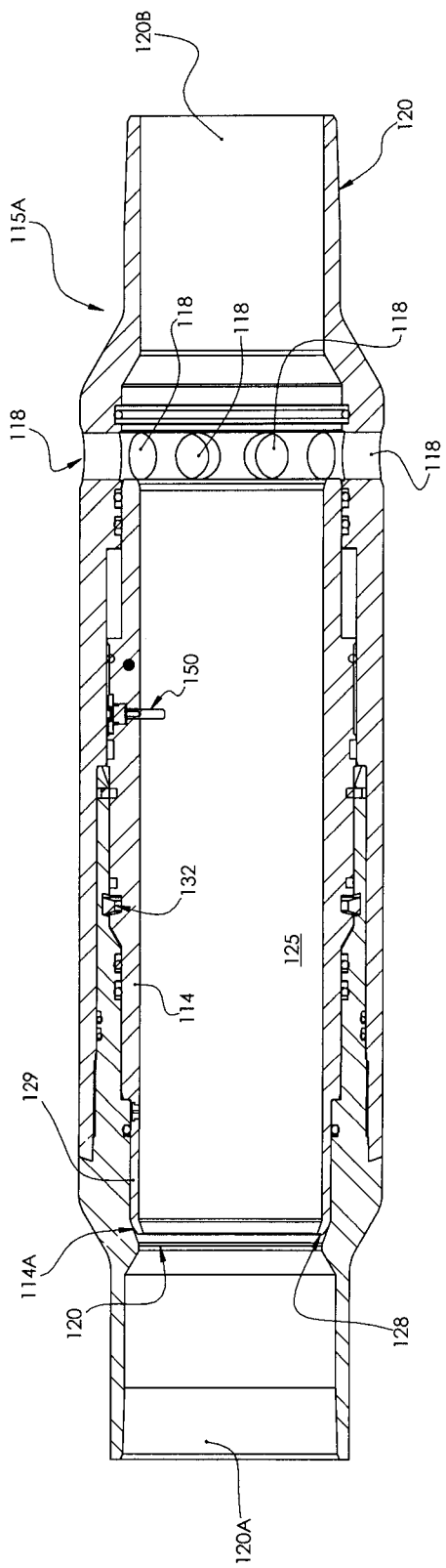
FIG. 3 is a side sectional view of the flow control apparatus illustrated in FIG. 2, illustrating the ports in the opened condition, and with the flow control member having been displaced and deformed to produce a seating surface for receiving a ball.
Figure 5:
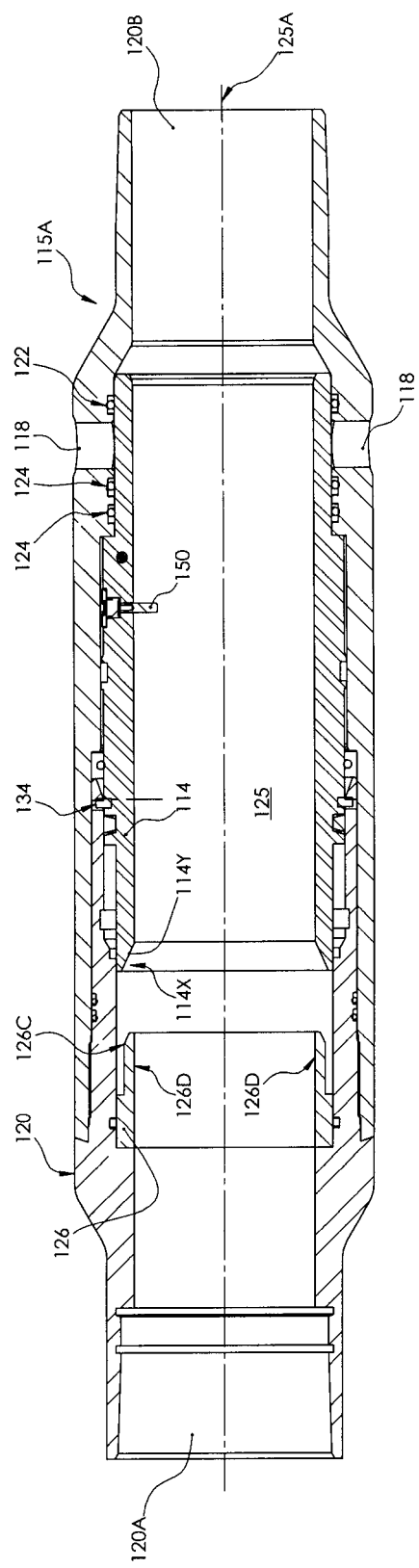
FIG. 5 is a side sectional view of another embodiment of a flow control apparatus for use in the system illustrated in FIG. 1, illustrating the ports in the closed condition.
Figure 6:
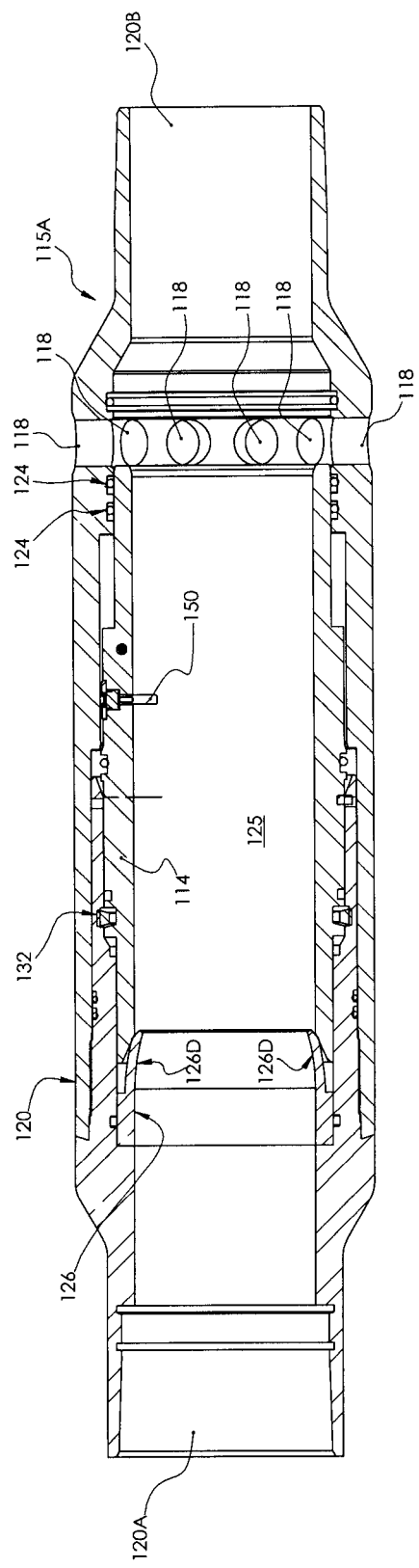
FIG. 6 is a side sectional view of the flow control apparatus illustrated in FIG. 5, illustrating the ports in the opened condition, and with the sleeve having been displaced and deformed to obtain a seating surface for receiving a ball.

In some embodiments, for example, the deformation is effected in response to the flow control member 114 is being displaced from the closed position (see FIGS. 2, 5, and 8) to the open position (see FIGS. 3, 6, and 11). In some embodiments, for example, the deformation is effected after the flow control member 114 has been displaced to the open position.

Figure 4:
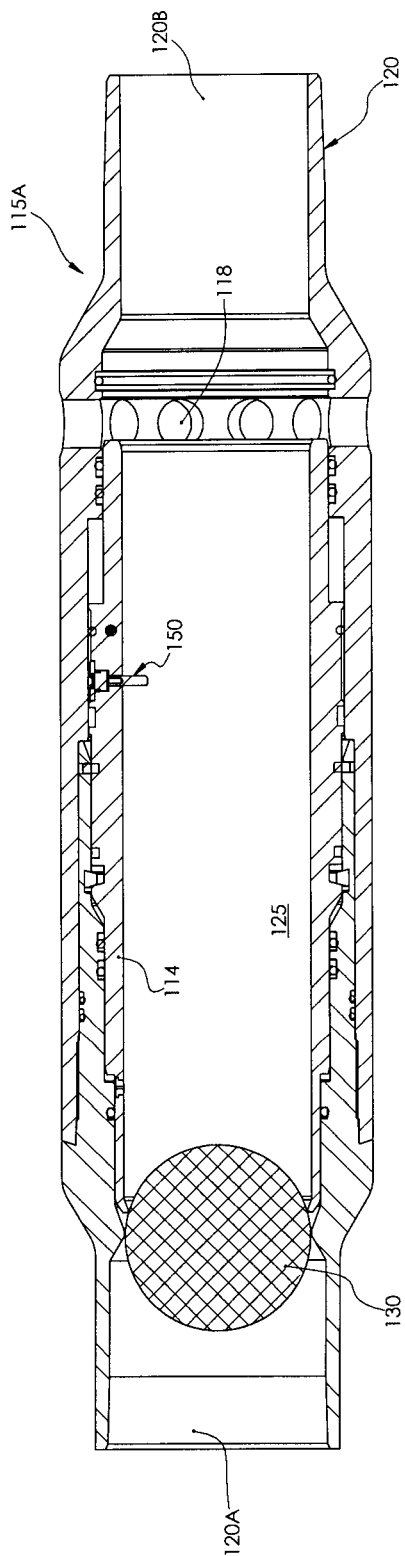
FIG. 4 is a side sectional view of the flow control apparatus illustrated in FIG. 2, illustrating the ports in the opened condition and with a ball having been landed on the seating surface produced by the deformation.
Figure 7:
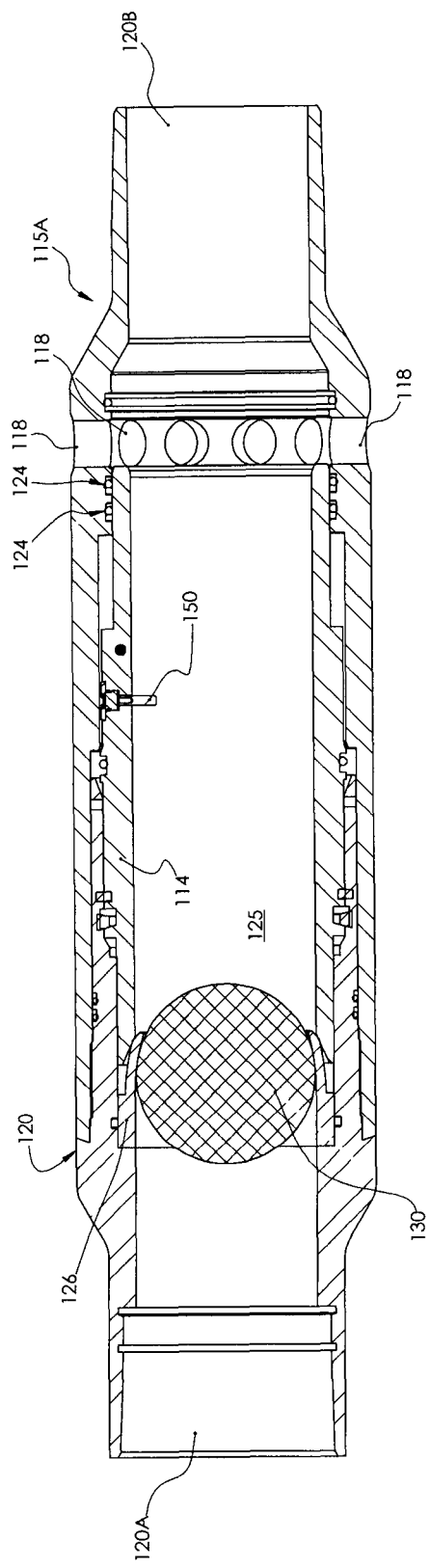
FIG. 7 is a side sectional view of the flow control apparatus illustrated in FIG. 5, illustrating the ports in the opened condition and with a ball having been landed on the seating surface obtained by the deformation.

Referring to FIGS. 4, 7, and 14 in some embodiments, for example, the obtained seating surface 128A is for receiving a flow communication-interference body 130, such that the flow communication-interference body 130 is seated on the obtained seating surface 128A, for effecting at least partial occlusion of the housing passage 125.

The flow communication-interference body 130 can be of any suitable form, including a plug, a ball, or a dart, so long as the form is conducive for effecting interference with flow communication through an opening within the wellbore. In some embodiments, for example. In some embodiments, for example, the flow communication-interference body 130 is configured for material degradation (such as, for example, by at least one of dissolution, chemical reaction, or disintegration) while disposed in contact with subterranean fluids (from within the wellbore, or external to the wellbore, or both) for a sufficient period of time. In this respect, in some embodiments, for example, the flow communication-interference body 130 and the flow control apparatus 115A are co-operatively configured such that, in response to the flow communication-interference body 130 being seated on the obtained seating surface 128 and in contact with subterranean fluids (from within the wellbore, or external to the wellbore, or both) for a sufficient period of time, the at least partial occlusion of the housing passage 125 is defeated.

Figure 25A:
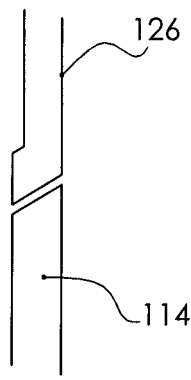
FIG. 25A to C are schematic illustrations, illustrating co-operative dispositions of the flow control member and the co-operating member in a sequence of events leading up to the deformation of the obtained seating surface in response to applied fluid pressure within the wellbore, including: (i) a disposition of the flow control member relative to the co-operating member, immediately prior to deformation (FIG. 25A), (ii) deformation of the co-operating member in response to contact engagement with the flow control member while the flow control member is being displaced relative to the one or more ports (FIG. 25B), and (iii) deformation of the obtained seating surface in response to application of fluid pressure within the wellbore (FIG. 25C)
Figure 25B:
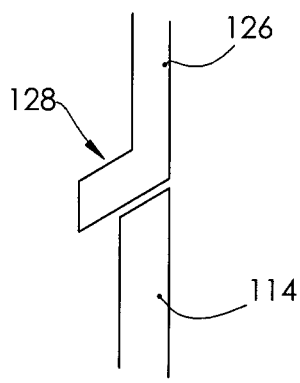
Figure 25C:
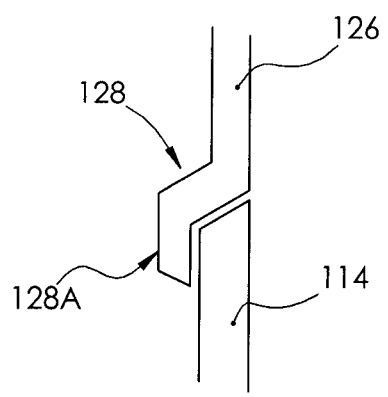

Referring to FIG. 25A to C, in some embodiments, for example, the flow control member 114 and the co-operating member 126 are co-operatively configured such that the obtained seat 128 is effective for maintaining the flow communication-interference body 130 in the seated condition while a pressure differential of at least 500 psi (such as, for example, at least 2500 psi, such as, for example, at least 5,000 psi, such as, for example, at least 7,500 psi, such as, for example, at least 10,000 psi) is applied across the seat 128 for at least five (5) minutes (such as, for example, at least 45 minutes, such as, for example, at least four (4) hours). In maintaining the flow communication-interference body 130 in the seated condition, the seat 128 resists passage of the flow communication-interference body through the seat, while the above-described pressure differential is being applied, such as that being applied during hydraulic fracturing (or "fracking") of an uphole stage. In this respect, in some embodiments, for example, a suitable contact area is provided between the flow communication-interference body 130 and the seating surface 128A such that, even if there is some deformation of the seat 128 due to an applied pressure differential, sufficient seating surface 128A is available for maintaining seating of the flow communication body 130 on the seat 128.

In some embodiments, for example, the at least partial occlusion of the housing passage 125 is for at least obstructing flow communication between housing inlet 120A and the one or more ports 118. In this respect, the obtained seating surface 128A is disposed between the housing inlet 120A and the one or more ports 118, and is, therefore, considered to be disposed uphole of the one or more ports 118. In this way, isolation between the flow communication station 115 and another flow communication station 115, disposed immediately uphole, is effected. In some embodiments, for example, the at least partial occlusion of the housing passage 125 is additionally for obstructing flow communication between housing inlet 120A and the housing outlet 120B.

Figure 26:
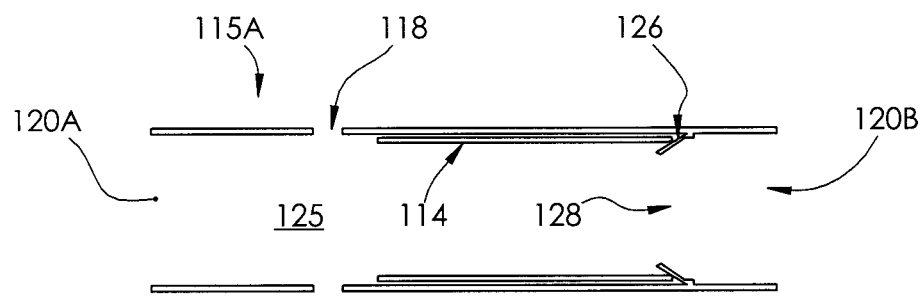
FIG. 26 is a side sectional view of another embodiment of a flow control apparatus for use in the system illustrated in FIG. 1, illustrating the ports in the opened condition, and with the sleeve having been displaced and deformed to obtain a seating surface for receiving a ball.

Referring to FIG. 26 in some embodiments, for example, the obtained seating surface 128A is disposed downhole relative to the one or more ports 118, that is, between the one or more ports 118 and the outlet 120B.

In some embodiments, for example, the obtaining of the seating surface 128A effects a change in condition of the flow control apparatus 115A to a flow communication interference body-receiving condition. In some embodiments, the flow communication interference body-receiving condition is obtained by displacing the flow control member 114 relative to the one or more ports 118, such as, for example, sufficiently to uncover the one or more ports 118. In some embodiments, for example, the flow communication interference body-receiving condition is obtained by displacing a secondary displaceable member, relative to the co-operating member 126, such that contact engagement is effected between the secondary displaceable member and the co-operating member 126, without displacing the flow control member 114 relative to the one or more ports 118.

In some embodiments, for example, the flow control member 114 and the housing 120 are co-operatively configured such that the flow control member 114 is sealingly, or substantially sealingly, engaged to the housing 114 at least while the flow control apparatus 115A is disposed in the flow communication interference body-receiving condition for preventing, or substantially preventing, communication of fluid across the seat 128 (i.e. between (i) a space within the housing passage 125 that is disposed uphole of the seat 128 and (ii) a space within the housing passage 125 that is disposed downhole of the seat 128, via the housing passage 125).

In some embodiments, for example, the flow control member 114 and the housing 120 are co-operatively configured such that the flow control member 114 is prevented, or substantially prevented, from effecting re-closure of the one or more ports 118, while the one or more ports 118 are disposed in the open condition. In some embodiments, for example, the flow control member 114 and the housing 120 are co-operatively configured such that the flow control member 114 is retained, relative to the housing 120, while the flow control member 114 is disposed in the open position, such that displacement of the flow control member 114, for effecting closure of the one or more ports 118, is prevented or substantially prevented. In some embodiments, for example, the flow control apparatus 115A further includes a retainer 132 (such as, for example, a lock ring or ratcheting mechanism) for effecting retention of the flow control member 114 in the open position at least while the flow control apparatus 115A is disposed in the flow communication interference body-receiving condition. These configurations are for preventing, or at least mitigating, re-closure of the one or more ports 118 by the flow control member 114, such as, for example, by application of relatively high fluid pressures during hydraulic fracturing through another flow communication station 115 that is disposed immediately uphole. In some embodiments, for example, the retainer 132 is coupled to the housing 125. In other embodiments, for example, the retention is effected by an interference fit between the flow control member 114 and the housing 125.

In some embodiments, for example, the co-operating member 126 extends from an internal surface of the housing and into the housing passage 125. In some embodiments, for example, the co-operating member 126 includes a protrusion 126E (see FIGS. 2 to 4).

In some embodiments, for example, the deformation of one of the flow control member 114 and the co-operating member 126 is attributable to one or more of the material of construction of the flow control member 114, the material of construction of the co-operating member 126, the geometry of the flow control member 114, the geometry of the co-operating member 126, and the force applied to the flow control member 114 for effecting the contact engagement between the flow control member 114 and the co-operating member 126.

Referring to FIGS. 2 to 4, in some embodiments, for example, the deformation, of one of the flow control member 114 and the co-operating member 126, is of the flow control member 114.

In some embodiments, for example, the deformation of the flow control member 114 is of a deformable portion 114A of the flow control member 114. In some embodiments, for example, the deformable portion 114A includes a seating surface precursor 114B, wherein the deformation of the deformable portion 114A is such that the seating surface precursor 114B is converted to the seating surface 128A. In this respect, the material of the deformable portion 114A is effective for being deformed in response to the contact engagement between the flow control member 114 and the co-operating member 126, and it is understood that the material of the remainder of the flow control member 115 can be of the same material or can be of a different material.

In some embodiments, for example, the seating surface precursor 114B is characterized by an elongation to failure of greater than about five (5) %, such as, for example, an elongation to failure of greater than about 20%.

In some embodiments for example, the material of construction of the deformable portion 114A is stiffer relative to the material of construction of the co-operating member 126. In some embodiments, for example, the material of construction of the flow control member 114 includes steel. In some embodiments, for example, the material of construction of the co-operating surface portion 126 includes steel.

In some embodiments, for example, the deformable portion 114A includes the leading edge of the flow control member 114.

In some embodiments, for example, the co-operating member 126 includes an engagement surface 126A for effecting the engagement with the flow control member 114, and the engagement surface includes a tapered surface portion 126B for encouraging the deformation of the flow control member 114. In some embodiments, for example, the displaceability of the flow control member 114 is parallel to, or substantially parallel to, the central longitudinal axis 125A of the housing passage 125, and the tapered surface portion 126B is tapered at an acute angle of between one (1) and 45 degrees relative to the central longitudinal axis 125B of the housing passage 125, such as, for example, between five (5) and 30 degrees relative to the central longitudinal axis 125B of the housing passage 125, such as, for example, 20 degrees relative to the central longitudinal axis 125B of the housing passage 125.

In some embodiments, for example, the deformation of the flow control member 114 includes a pinching of the portion 114A of the flow control member 114. In some embodiments, for example, the deformation of the flow control member 114 includes a compression of the portion 114A of the flow control member 114.

In some embodiments, for example, the deformation of the flow control member 114 is with effect that the portion 114A of the flow control member 114 is deformed inwardly towards the central longitudinal axis 125A of the housing passage 125.

In some embodiments, for example, the deformation of the flow control member 114 is with effect that the minimum cross-sectional area of the housing passage 125 (i.e. the smallest cross-sectional flow area of the housing passage 125, such as, for example, that portion of the housing passage 125 with the smallest diameter) is reduced. In some embodiments, for example, the housing passage 125 includes a pre-deformation minimum cross-sectional area, and the deformation of the flow control member 114 is with effect that the minimum cross-sectional area of the housing passage 125 is reduced such that the housing passage 125 includes a post-deformation minimum cross-sectional area, and the ratio of the post-deformation minimum cross-sectional area to the pre-deformation minimum cross-sectional area is between about 0.7 and about 0.98, such as, for example, between about 0.8 and about 0.97, such as, for example, about 0.88. In some embodiments, for example, the ratio of the post-deformation minimum cross-sectional area to the pre-deformation minimum cross-sectional area is less than about 0.9, such as, for example, between about 0.6 and about 0.9. In some embodiments, for example, the ratio of the post-deformation minimum cross-sectional area to the pre-deformation minimum cross-sectional area is less than about 0.8, such as, for example, between about 0.6 and about 0.8. In some embodiments, for example, the ratio of the post-deformation minimum cross-sectional area to the pre-deformation minimum cross-sectional area is less than about 0.7, such as, for example, between about 0.6 and about 0.7.

In some embodiments, for example, where the deformation being effected is of the flow control member 114, the co-operating member 126 includes a die.

Referring to FIGS. 5 to 20, in some embodiments, for example, the deformation, of one of the flow control member 114 and the co-operating member 126, is of the co-operating member 126.

In some embodiments, for example, the deformation of the co-operating member 126 is of a deformable portion 126C of the co-operating member 126. In some embodiments, for example, the deformable portion 126C includes a seating surface precursor 126D, wherein the deformation of the deformable portion 126C is such that the seating surface precursor 126D is converted to the seating surface 128A. In some embodiments, for example, the seating surface precursor 126D is characterized by an elongation to failure of greater than about five (5) %, such as, for example, an elongation to failure of greater than about 20%.

In some embodiments for example, the material of construction of the deformable portion 126C is stiffer relative to the material of construction of the flow control member 114. In some embodiments, for example, the material of construction of the flow control member 114 includes steel. In some embodiments, for example, the material of construction of the co-deformable portion 126C includes steel.

Referring to FIGS. 5 to 7, in some embodiments, for example, the co-operating member 126 is integrated within the housing 120 as a threadable insert.

Referring to FIGS. 8 to 20, in some embodiments, for example, the apparatus is configured such that the flow control member 114 is provided with sufficient travel distance to accrue sufficient momentum before effect the deformation of the co-operating member 126.

In this respect, and referring to FIGS. 8 and 9, in some embodiments, for example, the housing 120 further includes a stop 120A, and the housing 120, the flow control member 114, and the co-operating member 126 are co-operatively configured such that:

while the flow control member 114 is disposed in the closed position:
the flow control member 114 is releasably retained relative to the co-operating member 126 (such as, for example, by one or more frangible members 1141) such that the co-operating member 126 is translatable with the flow control member 114;
a deformation-urging portion 114C of the flow control member 114 is spaced-apart from the deformable portion 126C of the co-operating member 126; and
the co-operating member 126 is spaced apart from the stop 120A.

In this respect, while the flow control member 114 is being displaced from the closed position to the open position, the co-operative member 126 translates with the flow control member 114.

During the displacement of the flow control member 114 from the closed position to the open position (such as, for example, in an uphole direction), the co-operating member 126 becomes disposed relative to the stop 120A (such as, for example, becomes engaged to the stop 120A) with effect that translation of the co-operating member 126, with the flow control member 114, becomes opposed.

As force (e.g. a pulling up force, such as a pulling up force applied to the workstring) continues to be applied to the flow control member 114 while the co-operating member has become disposed relative to the stop 120A, as above-described, the flow control member 114 becomes released from the retention relative to the co-operating member 126. In this respect, in some embodiments, for example, the one or more frangible members becomes fractured by the applied force, thereby effecting the release.

Upon the releasing of the flow control member 114 from the retention relative to the co-operating member 126, and while force e.g. a pulling up force, such as a pulling up force applied to the workstring) continues to be applied to the flow control member 114, the flow control member 114 is displaced relative to the co-operating member 126. With sufficient displacement, the deformation-urging portion 114C of the flow control member 114 becomes disposed relative to the deformable portion 126C of the co-operating member 126 (such as, for example, becomes engaged to the deformable portion 126C) such that deformation of the deformable portion 126C is effected by the deformation-urging portion 114C (see FIGS. 11 and 12)

In some embodiments, for example, the apparatus is configured such that, after the flow control member 114 has become disposed in the open position (after having been displaced from the closed position), the flow control member 114 is prevented from re-closing the one or more ports 118.

In this respect, in some embodiments, for example, a retainer 1143 is provided for retaining the flow control member 114 in the open position. The housing 120, the flow control member 114 and the retainer 1143 are co-operatively configured such that, while the flow control member is disposed in the closed position, there is an absence of retention of the flow control member 114, relative to the housing 120, by the retainer 1143, and during the displacement of the flow control member 114 from the closed position to the open position, the retainer 1143 becomes disposed relative to the flow control member 114 with effect that the flow control member 114 becomes retained, relative to the housing, by the retainer 1143 such that displacement of the flow control member 114, relative to the one or more ports 118, to the closed position, is prevented or substantially prevented.

In some embodiments, for example, the retainer 1143 includes a retaining ring 1145 that is biased inwardly towards a contracted position. The housing 120, the flow control member 114, and the retaining ring 1145 are co-operatively configured such that, while the flow control member is disposed in the closed position, the retaining ring 1145 is disposed in an expanded condition and retained relative to the housing 120 such that during the displacement of the flow control member 114 from the closed position to the open position (such as, for example, in an uphole direction), and while the retaining ring 1145 is disposed in an expanded condition and retained relative to the housing 120, the flow control member 114 is displaced relative to the retaining ring 1145 (see FIG. 10). The flow control member 114 includes a recess 114E for receiving the retaining ring 1145 upon alignment of the recess 114E and the retaining ring 1145. In this respect, the housing 120, the flow control member 114, and the retaining ring 1145 are co-operatively configured such that, during the displacement of the flow control member 114 from the closed position to the open position (such as, for example, in the uphole direction), while there is an absence of alignment of the retaining ring 1145 and the recess 114E, the retaining ring 1145 is retained relative to the housing 120, the flow control member 114 is displaced relative to the retaining ring 1145 (such as, for example, in the uphole direction). Upon sufficient displacement of the flow control member 114 relative to the retaining ring 1145 in a direction that effects the opening of the one or more ports 118 (such as, for example, in the uphole direction), the recess 114E becomes aligned with the retaining ring 1145, and upon such alignment, and owing to the inward biasing of the retaining ring 1145, the retaining ring 1145 is contracted and becomes disposed within (e.g. snaps into) the recess 114E, such that the retaining ring 1145 becomes translatable with the flow control member 114 with effect that the retaining ring 1145 is disposed within the recess 114E upon the flow control member 114 becoming disposed in the open position (see FIG. 13). To prevent re-closing of the one or more ports 118 by the flow control member 114, the housing includes a further stop 120B. The housing 120, the flow control member 114, and the retaining ring 1145 are co-operatively configured such that, while the flow control member 114 is disposed in the open position, during displacement of the flow control member 114 to the closed position, the retaining ring 1145 becomes disposed relative to (such as, for example, disposed in engagement with) the stop 120B with effect that retention of the retaining ring 1145 and, therefore, the flow control member 114, is effected by the stop 120B, such that displacement of the flow control member 114, relative to the one or more ports 118, to the closed position is prevented or substantially prevented by the stop 120B.

In some embodiments, for example, the housing 120, the flow control member 114, and the co-operating member 126 are further co-operatively configured such that, while the deformation-urging portion 114C of the flow control member 114 is spaced-apart from the deformable portion 126C of the co-operating member 126; a receiving space 1262 is defined between the housing 120, the flow control member 114 and the co-operating member 126, and the receiving space 1262 is disposed for receiving the flow control member 120 (and, more specifically, the deformation-urging portion 114C) in response to the displacement of the flow control member 114 relative to the co-operating member 126, and cement retardant is disposed within (for example, fills) the receiving space 1262. The cement retardant is provided to mitigate ingress of cement into the receiving space 1262 during cementing operations.

In some embodiments, for example, the housing 120, the flow control member 114, and the co-operating member 126 are further co-operatively configured such that, while the receiving space 1262 is receiving the flow control member 114 (and, more specifically, the deformation-urging portion 114C) in response to displacement of the flow control member 114 relative to the co-operating member 126, the cement retardant is displaced from the receiving space 1262.

In some embodiments, for example, the apparatus further comprising one or more plugs 1264 for retaining the cement retardant within the receiving space. In some embodiments, for example, each one of the one or more plugs 1264, independently, seals, or substantially seals, a respective port provided through the co-operating member for effecting communication between the receiving space 1262 and the housing passage. In some embodiments, for example, the housing 120, the flow control member 114, and the co-operating member 126 are further co-operatively configured such that, while the receiving space 1262 is receiving the flow control member 114 (and, more specifically, the deformation-urging portion 114C) in response to displacement of the flow control member 114 relative to the co-operating member 126, a change in condition is effected to the one or more plugs 1264 such that retention of the cement retardant within the receiving space 1262, by the one or more plugs 1264, is defeated. In some embodiments, for example, the defeating of the retention of the cement retardant within the receiving space 1262 includes displacing of the one or more plugs 1264.

In some embodiments, for example, the opening of the one or more ports 118 is effected by an uphole displacement of the flow control member 114 relative to the one or more ports 118, and a downhole stop 160 is provided for limiting displacement, in the downhole direction, of the flow control member 114 relative to the one or more ports 118. The downhole stop 160, the flow control member 114, and the one or more ports 118 are co-operatively configured such that, while the flow control member 114 is disposed in the closed position, displaceability of the flow control member 114, in the downhole direction, is prevented by the downhole stop 160, such that the flow control member 114 remains disposed in the closed position (i.e. the one or more ports remain disposed in the closed condition). In some embodiments, for example, while the flow control member is retained in the closed position by one or more frangible members 134, the flow control member 114 is disposed in contact engagement with the downhole stop 160. In this respect, pressure testing at high pressures (for example, with fluid disposed at a pressure of at least about 5 MPa (such as, for example, at least about 40 MPa, such as, for example, at least about 100 MPa), between successive stages is made possible by virtue of this configuration, without inadvertently effecting opening of the one or more ports 118 of a flow control apparatus 115A. In this respect, after the subterranean formation has been stimulated via the opened one or more ports of a first flow control station 115, and while a flow communication interference body 130 is seated on the obtained seating surface 128A, pressure testing within a second flow communication station 115 that is disposed uphole relative to the first flow communication station 115 (which includes the seating surface 128A upon which the flow communication interference body 130 is seated and at least obstructing flow communication with (such as, for example, isolating) the opened one or more ports 118). In some embodiments, for example, the pressure testing includes: supplying fluid into the wellbore such that fluid pressure is communicated to the uphole-disposed flow communication station 115, and monitoring the fluid pressure within the wellbore.

Referring to FIGS. 8, 11, 14, 17 and 18, in some embodiments, for example, the portion of the housing 120 through which the flow control member 114 is displaced is configured to be as thin as possible in order to maximize the available wellbore for conducting of material flow (through the housing passage 125). To do so, the loss of mechanical strength is compensated by configuring other components to support such housing portion while still maximizing the available flow area.

In this respect, the housing 120 includes a bottom sub 12020 including a first housing portion 1202 and a top sub 12040 including second housing portion 1204. The first housing portion 1202 is disposed in a partially overlapping relationship with the second housing portion 104. The first housing portion 1202 is substantially thinner than the second housing portion 1204.

A sealed interface 120X is defined between the first housing portion 1202 and the second housing portion 1204, and, for example, is effected by a sealing member, such as, for example, an o-ring. Relatedly, a sealed interface 120Y is defined between the first housing portion 1202 and the flow control member 114, and, for example, is effected by the sealing member 124, such as, for example, an o-ring. A chamber 120W (and, in some embodiments, for example, multiple chambers) is disposed between the sealed interfaces 120X and 120Y. In some embodiments, for example, the chamber 120W is disposed at about atmospheric pressure.

In some embodiments, for example, the displaceability of the flow control member 114 is along a displacement axis that is parallel, or substantially parallel, to the central longitudinal axis of the housing passage 125, and the displacement of the flow control member 114, from the closed position to the open position, is over a distance of at least 0.25 inches along the displacement axis, such as, for example, over a distance of at least 0.5 inches along the displacement axis, over a distance of at least two (2) inches along the displacement axis, such as, for example, over a distance of at least four (4) inches along the displacement axis. In some embodiments, for example, a longer travel distance of the flow control member 114 dictates a larger chamber 120W, which may compromise mechanical strength and require corresponding compensation by configuring other components accordingly.

The first housing portion 1202 includes an inner surface 1202A and an outermost surface 1202B disposed on an opposite side of the first housing portion 1202 relative to the inner surface 1202A.

A portion of the inner surface 1202A is disposed in pressure communication with the chamber 120W. In some embodiments, for example, the outermost surface 1202B is configured for being disposed in fluid pressure communication with the subterranean formation while disposed within a wellbore that extends into the subterranean formation. In this respect, while the flow control member is disposed in the closed position such that fluid pressure is not equalized between the housing passage 125 and the environment outside of the housing 120, the housing 120, and, specifically, the first housing portion 1202, may be susceptible to significant stresses. In this respect, the first housing portion 1202 is strengthened by support from other components of the apparatus.

In this respect, a plurality of spaced apart first support members 1204A extend from the second housing portion 1204 and into the chamber 120W. Each one of the first support members 1204A, independently, includes a respective first support surface 1204B. Each pair of adjacent ones of the plurality of spaced apart first support members 1204A, independently, define a receiving space 1204C therebetween, such that at least one receiving space 1204C is provided. In some embodiments, for example, the receiving space 1204C in the form of a channel.

As well, at least one second support member 1142A extends from the flow control member 114 in a direction away (outwardly direction) relative to the central longitudinal axis of the housing passage 125. In some embodiments, for example, each one of the at least one second support member 1142A, independently, is in the form of a rib. Each one of the at least one second support member 1142A, independently, includes a respective second support surface 1142B. In some embodiments, for example, the at least one second support member 1142A is a plurality of second support members 1142A, and each pair of adjacent ones of the plurality of spaced apart first support members 1142A, independently, define a receiving space 1142A therebetween, such that at least one receiving space 1142C is provided. In some embodiments, for example, the receiving space 1142 is in the form of a channel.

The first housing portion 1202, the second housing portion 1204, the flow control member 114 and the one or more ports 118 are co-operatively configured such that:

for each one of the plurality of spaced apart first support members 1204A, independently, the respective first support surface 1204B is opposing, within the chamber 120W, a first portion of the inner surface 1202A of the first housing portion 1202; and at least while the flow control member is disposed in the closed position, for each one of the at least one spaced apart second support member 1142A, independently, the respective second support surface 1142B is opposing, within the chamber 120W, a second portion of the inner surface 1202A of the first housing portion 1202.

The chamber 120W is disposed in fluid pressure communication with at least the first and second portions of the inner surface 1202A.

In some embodiments, for example, for at least one (such as, for example, each one) of the first support members 1204A, independently, the ratio of (a) the thickness of the respective support surface 1204B of the first support member 1204A to (b) the thickness of an opposed portion of the first housing portion 1202 that is being opposed by the respective support surface 1204B of the first support member 1204B is at least about 0.75:1, such as, for example about 1:1.

In some embodiments, for example, for at least one (such as, for example, each one) of the second support member 1142A, independently, the ratio of (a) the thickness of the respective support surface 1142B of the second support member 1142A to (b) the thickness of an opposed portion of the first housing portion 1202 that is being opposed by the respective support surface 1142B of the second support member 1142A is at least about 0.75:1, such as, for example at least about 1:1.

In some embodiments, for example, an opposed portion of the first housing portion has a minimum thickness of at least about 0.125 inches, such as, for example, from about 0.125 inches to about 0.5 inches. In some embodiments, for example, the flow control member 114 and the first housing portion 1202 are co-operatively configured such that, while the flow control member 114 is being displaced from the closed position to the open position, the flow control member 114 is displaced past the first housing portion 1202.

In some embodiments, for example, each one of the plurality of spaced apart first support members 1204A, independently, is spaced apart from the first housing portion 1202 by a minimum distance of less than about $12/1000$ of an inch, such as, for example, between about $3/1000$ of an inch and about $12/1000$ of an inch.

In some embodiments, for example, at least while the flow control member is disposed in the closed position, each one of the at least one spaced apart second support member 1142A, independently, is spaced apart from the first housing portion 1202 by a minimum distance of less than about $12/1000$ of an inch, such as, for example, between about $3/1000$ of an inch and about $12/1000$ of an inch.

In one aspect, the at least one second support member 1142A and the at least one receiving space 1204C is co-operatively configured such that the displacement of the flow control member 114 from the closed position to the open position is with effect that each one of the at least one second support member 1142A, independently, is received within a corresponding one of the at least one receiving space 1204C and in-between corresponding spaced apart first support members 1204. In some embodiments, for example, a plurality of spaced apart second support members 1142A and a plurality of receiving spaces 1142C are provided, and the plurality of spaced apart first support members 1204A and the plurality of receiving spaces 1142C are co-operatively configured such that the displacement of the flow control member 114 from the closed position to the open position is with effect that each one of the plurality of first support members 1204A, independently, is received within a corresponding one of the plurality of receiving spaces 1142C and in-between corresponding spaced apart second support members 1142A.

In another aspect, the displacement of the flow control member 114 from the closed position to the open position effects at least partial nesting of the at least one second support member 1142A with the plurality of spaced apart first support members 1204 (at least partial nesting is illustrated in FIG. 18).

In some embodiments, for example, each one of the spaced apart first support members 1204A, independently, is defined by a longitudinally extending finger, wherein, each one of the fingers, independently, has a longitudinal axis that is parallel to, or substantially parallel to, the central longitudinal axis of the housing passage 125. In some embodiments, for example, the spaced apart first support members 1204A are spaced apart from each other along an inner perimeter of the second housing portion 204. In some embodiments, for example, the spaced apart first support members 1204A are circumferentially spaced apart from each other. In some embodiments, for example, each one of the at least one spaced apart second support member 1142A, independently, is longitudinally extending and includes a longitudinal axis that is disposed parallel to, or substantially parallel to, the axis along which the flow control member 114 is displaceable from the closed position to the open position. In some embodiments, for example, the at least one spaced apart second support member 1142 is a plurality of second support members, and the plurality of second support members 1142 is circumferentially spaced apart from each other. In some embodiments, for example, the plurality of spaced apart first support members 1204A are, correspondingly with the plurality of second support members 1142, spaced apart from each other.

Referring to FIGS. 5 to 7, in some embodiments, for example, the flow control member 114 includes an engagement surface 114X for effecting the engagement with the co-operating member, and the engagement surface 114X includes a tapered surface portion 114Y for encouraging the deformation of the co-operating member 126. In some embodiments, for example, the displaceability of the flow control member 114 is parallel to, or substantially parallel to, the central longitudinal axis 125A of the housing passage 125, and the tapered surface portion 126Y is tapered at an acute angle of between one (1) and 45 degrees relative to the central longitudinal axis 125B of the housing passage 125, such as, for example, between five (5) and 30 degrees relative to the central longitudinal axis 125B of the housing passage 125, such as, for example, 20 degrees relative to the central longitudinal axis 125B of the housing passage 125.

In some embodiments, for example, the deformation of the co-operating member 126 includes a pinching of the portion 126A of the co-operating member 126. In some embodiments, for example, the deformation of the co-operating member 126 includes a compression of the portion 126A of the co-operating member 126.

In some embodiments, for example, the deformation of the co-operating member 126 is with effect that the portion 126A of the co-operating member 126 is deformed inwardly towards the central longitudinal axis 125A of the housing passage 125.

In some embodiments, for example, the deformation of the co-operating member 126 is with effect that the minimum cross-sectional area of the housing passage 125 is reduced. In some embodiments, for example, the housing passage 125 includes a pre-deformation minimum cross-sectional area, and the deformation of the co-operating member 126 is with effect that the minimum cross-sectional area of the housing passage 125 is reduced such that the housing passage 125 includes a post-deformation minimum cross-sectional area, and the ratio of the post-deformation minimum cross-sectional area to the pre-deformation minimum cross-sectional area is at least about 0.6, such as, for example, between about 0.6 and about 0.98, such as, for example, between about 0.7 and about 0.98, such as, for example, between about 0.8 and about 0.97, such as, for example, about 0.88. In some embodiments, for example, the ratio of the post-deformation minimum cross-sectional area to the pre-deformation minimum cross-sectional area is less than about 0.9, such as, for example, between about 0.6 and about 0.9. In some embodiments, for example, the ratio of the post-deformation minimum cross-sectional area to the pre-deformation minimum cross-sectional area is less than about 0.8, such as, for example, between about 0.6 and about 0.8. In some embodiments, for example, the ratio of the post-deformation minimum cross-sectional area to the pre-deformation minimum cross-sectional area is less than about 0.7, such as, for example, between about 0.6 and about 0.7.

Referring to FIGS. 8, 11, 14, and 17 to 22, in some embodiments, for example, the displacement of the flow control member 114 from the closed position to the open position is effected in response to urging by fluid pressure that is communicated from the housing passage 125 to a fluid responsive surface 140 of the flow control member 114.

In some of these embodiments, for example, a sealed interface is disposed between the housing passage 125 and the fluid responsive surface 140, and the sealed interface effects sealing, or substantial sealing, of fluid pressure communication between the housing passage 125 and the fluid responsive surface 140. Fluid pressure communication between the housing passage 125 and the fluid responsive surface 140 (for effecting the displacement of the flow control member 114 from the closed position to the open position) is established in response to defeating of the sealed interface. The defeating of the sealed interface can be effected directly or indirectly in response to sensing of a downhole-communicated signal by a sensor 150.

In some embodiments, for example, the defeating of the sealed interface, for establishing fluid pressure communication between the housing passage 125 and the fluid responsive surface 140, is effected directly in response to sensing, by the sensor 150, of a signal that is communicated downhole. In this respect, referring to FIGS. 21 and 22, in some of these embodiments, for example, the flow control apparatus 115A includes a fluid communication actuator 302 and a sealed interface 304. The sealed interface 304 effects sealing, or substantial sealing, of the fluid responsive surface 140 from the housing passage 125. The flow communication actuator 302 is configured for defeating the sealed interface 304. In this respect, the actuator 302 is responsive to sensing of a sealed interface-defeating ("SID") signal by the sensor 150 for defeating the sealed interface 304 such that establishment of the flow communication between the housing passage 125 and the fluid responsive surface 140 is effected. The establishment of the flow communication is such that fluid, disposed within the housing passage 125, is communicated from the housing passage 125 to effect the application of fluid pressure on the fluid responsive surface 140.

In some embodiments, for example, the SID signal is transmitted through the wellbore 102. In some of these embodiments, for example, the SID signal is transmitted via fluid disposed within the wellbore 102.

In some embodiments, for example, the SID signal is a pressure signal, such as one or more pressure pulses. In some embodiments, for example, the SID signal is defined by a pressure pulse characterized by at least a magnitude. In some embodiments, for example, the SID signal is defined by a pressure pulse characterized by at least a duration. In some embodiments, for example, the SID signal is defined by a pressure pulse characterized by a combination of at least a magnitude and a duration.

In some embodiments, for example, the SID signal is defined by a plurality of pressure pulses. In some embodiments, for example, the SID signal is defined by a plurality of pressure pulses, each one of the pressure pulses characterized by at least a magnitude. In some embodiments, for example, the SID signal is defined by a plurality of pressure pulses, each one of the pressure pulses characterized by at least a magnitude and a duration. In some embodiments, for example, the SID signal is defined by a plurality of pressure pulses, each one of the pressure pulses characterized by at least a duration. In some embodiments, for example, each one of pressure pulses is characterized by time intervals between the pulses.

In this respect, in those embodiments where the SID signal is a pressure signal, in some of these embodiments, for example, the sensor 150 is a pressure sensor. An exemplary pressure sensor is a Kellar Pressure Transducer Model 6LHP/81188TM. Other suitable sensors may be employed, depending on the nature of the signal being used for the actuating signal. Other suitable sensors include a Hall effect sensor, a radio frequency identification ("RFID") sensor, or a sensor that can detect a change in chemistry (such as, for example, pH), or radiation levels, or ultrasonic waves.

In some embodiments, for example, the sensor 150 is disposed in communication within the wellbore 102, and the SID signal is being transmitted within the wellbore 102, such that the sensor 150 is disposed for sensing the SID signal being transmitted within the wellbore 102. In some embodiments, for example, the sensor 150 extends into the wellbore 102. In this respect, in some embodiments, for example, the sensor 150 is mounted to the housing 120 within a hole that is ported to the wellbore 102, and is held in by a backing plate that is configured to resist the force generated by pressure acting on the sensor 150.

In some embodiments, for example, the sensor 150 is configured to receive a signal generated by a seismic source. In some embodiments, for example, the seismic source includes a seismic vibrator unit. In some of these embodiments, for example, the seismic vibration unit is disposed at the surface 10.

In some embodiments, for example, the flow control apparatus 115A further includes a controller. The controller is configured to receive a sensor-transmitted signal from the sensor 150 upon the sensing of the SID signal and, in response to the received sensor-transmitted signal, supply a transmitted signal to the actuator 302. In some embodiments, for example, the controller and the sensor 150 are powered by a battery that is disposed on-board within the flow control apparatus 115A. Passages for wiring for electrically interconnecting the battery, the sensor, the controller and the trigger are also provided within the apparatus 115A.

Figure 21:
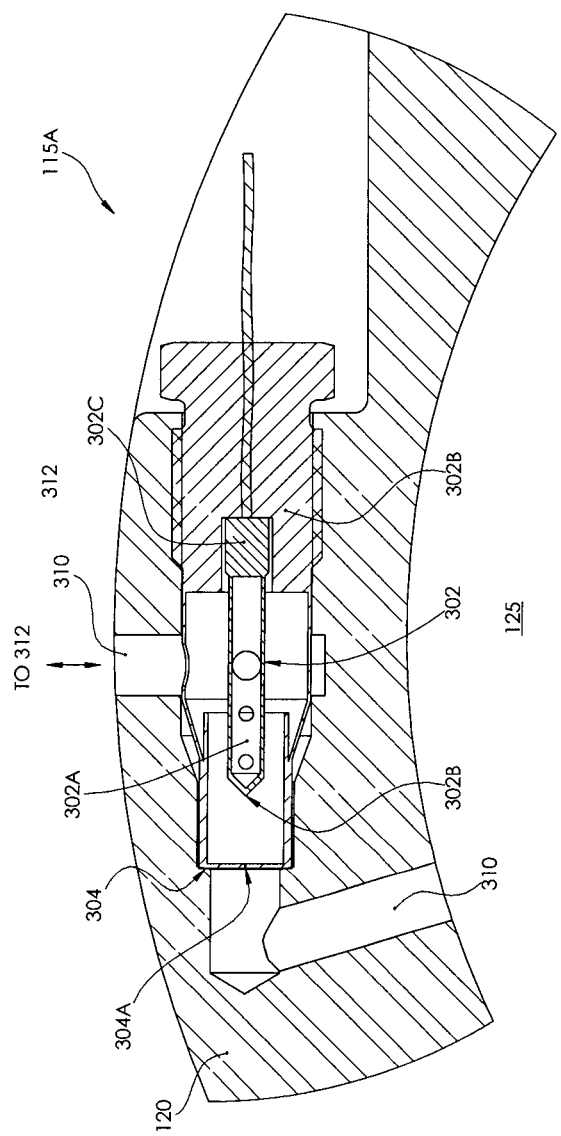
FIG. 21 is a schematic illustration of a fragment of the flow control apparatus Illustrated in FIG. 8 having a cutter as its flow communication actuator, illustrated prior to the puncturing of a rupture disc.
Figure 22:
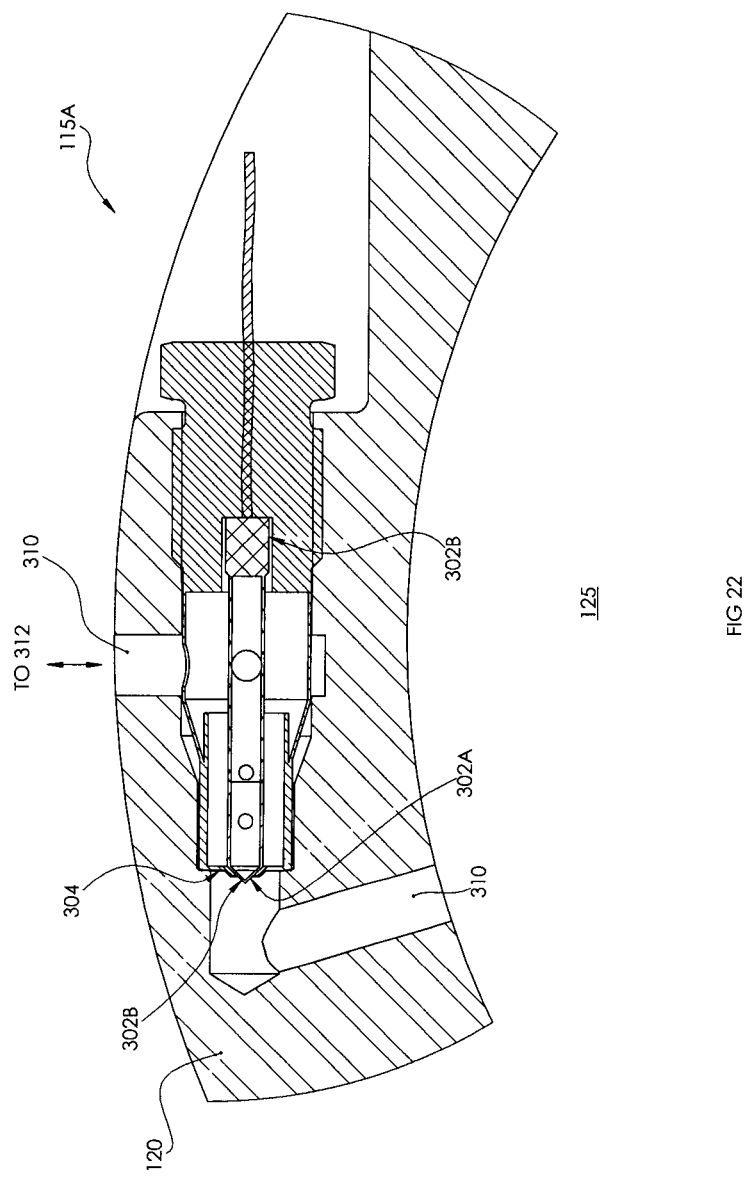
FIG. 22 is a schematic illustration of the fragment shown in FIG. 8, illustrated after the puncturing of a rupture disc by the cutter.

Referring to FIGS. 21 and 22, in some embodiments, for example, the flow communication actuator 302 is in the form of a cutter, and the sealed interface 304 is defined by a rupture disc 304A. The cutter 302 is configured for puncturing the sealing member 304 in response to the sensing of an actuating signal by the sensor 150. The puncturing of the sealing member 304 by the cutter 302 is with effect that the sealed interface 304 is defeated. In some embodiments, for example, the cutter 302 includes a bayonet 302A that is actuatable by an actuator 302B, such as an actuator including a squib 302C. Upon actuation by the squib 302C, the bayonet 302B punctures the rupture disc 304, such that flow communication is effected between the housing passage 125 and the fluid responsive surface 140 of the flow control member 114 for effecting displacement of the flow control member 114 relative to the one or more ports 118, from the closed position to the open position, and thereby uncovering the one or more ports 118. In some embodiments, for example, the flow communication between the housing passage 125 and the fluid pressure responsive surface 140 is via a flow communication passage 310 that extends through the flow control member 114. In this respect, the sealed interface 304 effects sealing of the flow communication passage 310.

In some embodiments, for example, the flow control apparatus 115A further includes first and second chambers 312, 314. The first chamber 312 is disposed in flow communication with the fluid responsive surface 140 for receiving pressurized fluid (such as, for example, a liquid) from the housing passage 125 via the passageway 310, while the sealed interface 304 is defeated (such as, for example, by the puncturing of the rupture disc 304 by the cutter). The second chamber 314 is configured for containing a fluid and disposed relative to the flow control member 114 such that fluid (e.g. liquid) contained within the second chamber 314 opposes the displacement of the flow control apparatus 115A that is being urged by pressurized fluid within the first chamber 312, and the displacement of the flow control member 114 is effected when the force imparted to the flow control member 114 by the pressurized fluid (e.g. liquid) within the first chamber 312 exceeds the force imparted to the flow control member by the fluid (e.g. liquid) within the second chamber 314. In some embodiments, for example, the displacement of the flow control member 114 is effected when the pressure imparted to the flow control member 114 by the pressurized fluid (e.g. liquid) within the first chamber 312 exceeds the pressure imparted to the flow control member 114 by the fluid (e.g. liquid) within the second chamber 314. In some embodiments, for example, the fluid within the second chamber 314 is disposed at about atmospheric pressure.

In some embodiments, for example, both of the first and second chambers 312, 314 are defined by respective spaces interposed between the housing 120 and the flow control member 114, and a chamber sealing member 316 is provided for effecting a sealed interface between the chambers 312, 314, while the flow control member 114 is being displaced to effect the opening of the one or more ports 118.

Figure 23:
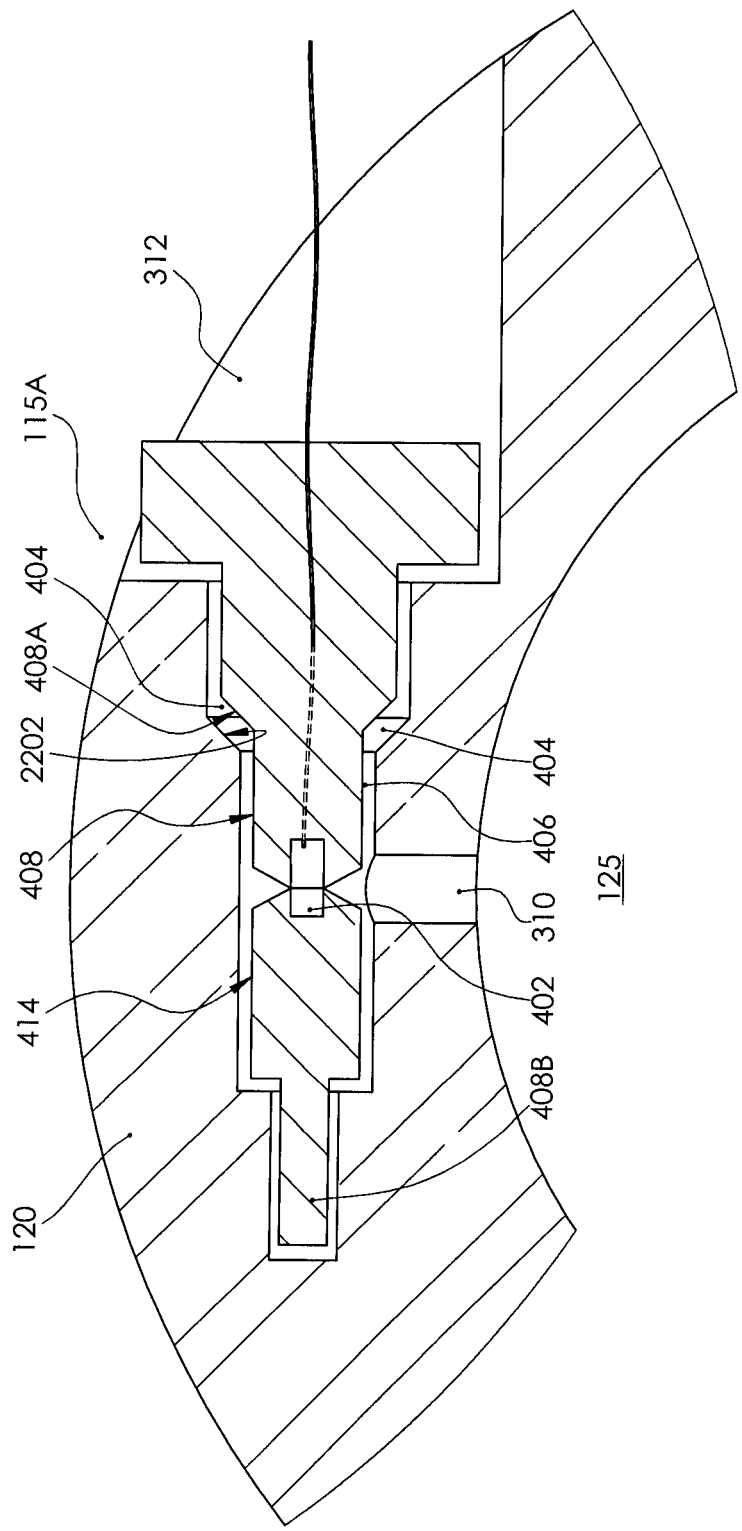
FIG. 23 is a schematic illustration of a fragment of another embodiment of the flow control apparatus, having a sealed interface-conditioning actuator for effecting a change in condition of the sealed interface from a non-defeatable condition to a defeatable condition, to enable defeating of the sealed interface by application of fluid pressure to enable communication of fluid pressure to effect opening of the flow control member.
Figure 24:
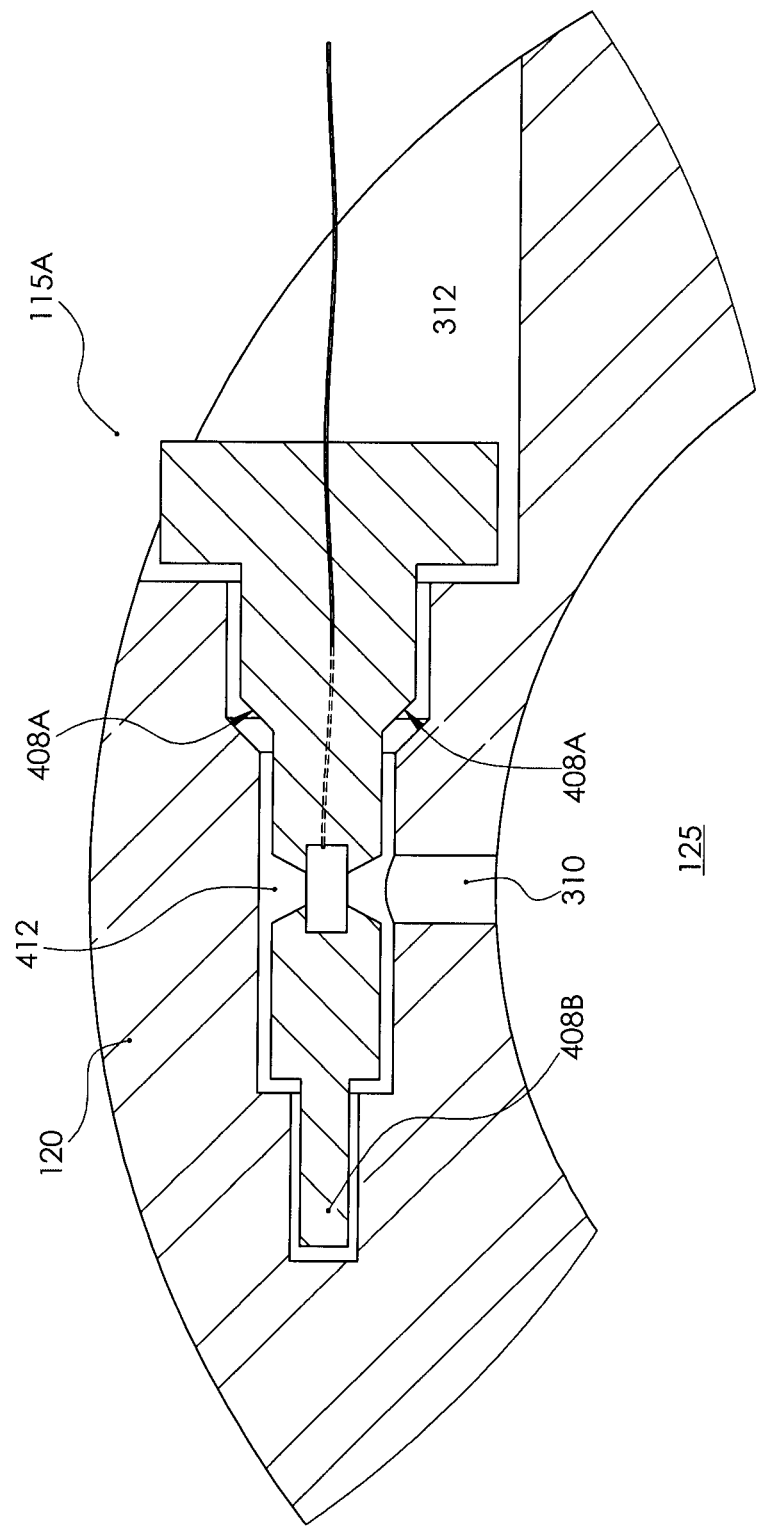
FIG. 24 is schematic illustration of the fragment shown in FIG. 23, after actuation of the sealed interface-conditioning actuator, but before the defeating of the sealed interface.

In some embodiments, for example, the defeating of the sealed interface, for establishing fluid pressure communication between the housing passage 125 and the fluid responsive surface 140, is effected indirectly in response to sensing, by the sensor 150, of a signal that is communicated downhole. In this respect, referring to FIGS. 23 and 24, in some embodiments, for example, the flow control apparatus 115A includes a sealed interface-conditioning actuator 402 configured for effecting a change in condition of the sealed interface 406 from a non-defeatable condition to a defeatable condition. While the sealed interface 406 is disposed in the defeatable condition, defeating of the sealed interface 406 is effected in response to communication of a pressurized fluid, such as pressurized fluid within the housing passage 125. After the defeating of the sealed interface 406, flow communication is established between the housing passage 125 and the fluid responsive surface 140 (not shown) of the flow control member 114. In this respect, the flow control member 114 becomes displaceable from the closed position to the open position in response to the communication of fluid pressure from the housing passage 125 to the fluid responsive surface 140 via the flow communication passage 310.

The actuator 402 is configured to effect a change in condition of the sealed interface 406 from a non-defeatable condition to a defeatable condition in response to sensing of a sealed interface actuation ("SIA") signal by the sensor 150 (it is understood that "non-defeatable" does not mean that the sealed interface 406 cannot be defeated for all purposes, but under normal operating conditions, the sealed interface is not defeatable, and, at minimum, the sensing of the SIA signal by the sensor 150 effects a change in condition such that the sealed interface to a relatively more defeatable condition, and defeatable upon application of fluid pressure during normal operating conditions). In some embodiments, for example, the SIA signal is transmitted through the wellbore 102. In some of these embodiments, for example, the SIA signal is transmitted via fluid (e.g. liquid) disposed within the wellbore 102.

In some embodiments, for example, the SIA signal is a pressure signal, such as one or more pressure pulses. In some embodiments, for example, the SIA signal is defined by a pressure pulse characterized by at least a magnitude. In some embodiments, for example, the pressure pulse is further characterized by at least a duration. In some embodiments, for example, the SIA signal is defined by a pressure pulse characterized by at least a duration.

In some embodiments, for example, the SIA signal is defined by a plurality of pressure pulses. In some embodiments, for example, the SIA signal is defined by a plurality of pressure pulses, each one of the pressure pulses characterized by at least a magnitude. In some embodiments, for example, the SIA signal is defined by a plurality of pressure pulses, each one of the pressure pulses characterized by at least a magnitude and a duration. In some embodiments, for example, the SIA signal is defined by a plurality of pressure pulses, each one of the pressure pulses characterized by at least a duration. In some embodiments, for example, each one of pressure pulses is characterized by time intervals between the pulses.

In this respect, in those embodiments where the SID signal is a pressure signal, in some of these embodiments, for example, the sensor 150 is a pressure sensor. An exemplary pressure sensor is a Kellar Pressure Transducer Model 6LHP/81188TM. Other suitable sensors may be employed, depending on the nature of the signal being used for the actuating signal. Other suitable sensors include a Hall effect sensor, a radio frequency identification ("RFID") sensor, or a sensor that can detect a change in chemistry (such as, for example, pH), or radiation levels, or ultrasonic waves.

In some embodiments, for example, the sensor 150 is disposed in communication within the wellbore 100, and the SIA signal is being transmitted within the wellbore 100, such that the sensor 150 is disposed for sensing the SIA signal being transmitted within the wellbore 100. In some embodiments, for example, the sensor 150 is disposed within the wellbore 100. In this respect, in some embodiments, for example, the sensor 150 is mounted to the housing 120 within a hole that is ported to the wellbore 102, and is held in by a backing plate that is configured to resist the force generated by pressure acting on the sensor 150.

In some embodiments, for example, the sensor 150 is configured to receive a signal generated by a seismic source. In some embodiments, for example, the seismic source includes a seismic vibrator unit. In some of these embodiments, for example, the seismic vibration unit is disposed at the surface 10.

In some embodiments, for example, the flow control apparatus 115A further includes a controller. The controller is configured to receive a sensor-transmitted signal from the sensor 150 upon the sensing of the SIA signal and, in response to the received sensor-transmitted signal, supply a transmitted signal to the actuator 402. In some embodiments, for example, the controller and the sensor 150 are powered by a battery that is disposed on-board within the flow control apparatus 115A. Passages for wiring for electrically interconnecting the battery, the sensor 150, the controller and the actuator 402 are also provided within the apparatus 115A.

In some embodiments, for example, the flow control apparatus 115 further includes a valve member 408, and the sealed interface 404 is defined by sealing, or substantially sealing, engagement between the valve member 408 and the housing 120. In this respect, the change in condition of the sealed interface 404 is effected by a change in condition of the valve member 408. Also in this respect, the actuator 402 is configured to effect a change in condition of the valve member 408 (in response to the sensing of the signal by the sensor 150) such that the sealed interface 404 becomes disposed in the defeatable condition. In this respect, while the sealed interface 404 (defined by the sealing, or substantially sealing, engagement between the valve member 408 and the housing 120) is disposed in the defeatable condition (the defeatable condition having been effected in response to the change in condition of the valve member 408, as above-described), in response to receiving communication of a pressurized fluid (e.g. liquid), there is a loss of the sealing, or substantially sealing, engagement between the valve member 408 and the housing 120. As a result, there is a loss of sealing, or substantially sealing, engagement between the valve member 408 and the housing 120, such that the sealed interface 404 is defeated, and such that flow communication is established between the housing passage 125 and the fluid responsive surface 140.

In some embodiments, for example, the valve member 408 includes a valve sealing surface 408A configured for effecting the sealing, or substantially sealing, engagement between the valve member 408 and the housing 120. In this respect, the sealing, or substantially sealing, engagement between the valve member 408 and the housing 120 is effected by the sealing, or substantially sealing, engagement between the valve sealing surface 408A and a housing sealing surface 2202. Also in this respect, the change in condition of the valve member 408 is such that the valve sealing surface 408A becomes displaceable relative to the housing sealing surface 2202 for effecting a loss of the sealing, or substantially sealing, engagement between the valve sealing surface 408A and the housing sealing surface 2202, such that the sealed interface 404 is defeated and such that flow communication is established between the housing passage 125 and the fluid responsive surface 140. Also in this respect, the loss of the sealing, or substantially sealing, engagement between the valve member 408 and the housing 120, that is effected in response to receiving communication of a pressurized fluid while the valve member 408 is disposed such that the valve sealing surface 408A is displaceable relative to the housing sealing surface 2202, includes the loss of the sealing, or substantially sealing, engagement between the valve sealing surface 408A and the housing sealing surface 2202.

In some embodiments, for example, the flow control apparatus 115A further includes a passageway 410, and the passageway 410 extends between the housing passage 125 and the fluid responsive surface 140. The valve member 408 and the passageway 410 are co-operatively disposed such that the flow communication between the housing passage 125 and the fluid responsive surface 140 is established in response to the displacement of the valve member 408 relative to the passageway 410, effected in response to the sensing of the SIA by the sensor 150. Sealing, or substantial sealing, of the passageway 410 is effected by the sealing or substantially sealing, engagement between the valve member 408 and the housing 120 (and, in some embodiments, for example, the valve sealing surface 408A and the housing sealing surface 2202). Also in this respect, sealing, or substantially sealing, of flow communication between the housing passage 125 and the fluid responsive surface 140 is effected by the sealing or substantially sealing, engagement between the valve member 408 and the housing 120 (and, in some embodiments, for example, the valve sealing surface 408A and the housing sealing surface 2202).

In some embodiments, for example, the actuator 402 includes a squib, and the change in condition of the sealed interface 404 (and also, in some embodiments, for example, the valve member 408) is effected by an explosion generated by the squib in response to sensing of the signal by the sensor 150. In some embodiments, for example, the squib is suitably mounted within the housing 120 to apply the necessary force to the valve member 408. Another suitable valve actuator 402 is a fuse-able link or a piston pusher.

In some embodiments, for example, the change in condition of the valve member 408 includes a fracturing of the valve member 408. In the embodiment illustrated in FIG. 24, the fracture is identified by reference numeral 412. In some embodiments, for example, while the valve member 408 is disposed in a fractured condition, in response to receiving communication of a pressurized fluid, a loss of the sealing, or substantially sealing, engagement between the valve member 408 and the housing 120 is effected, such that there is an absence of sealing, or substantially sealing, engagement between the valve member 408 and the housing 120, and such that the sealed interface 404 is defeated and such that flow communication is established between the housing passage 125 and the fluid responsive surface 140.

In those embodiments where the change in condition of the valve member 408 includes a fracturing of the valve member 408, in some of these embodiments, for example, the valve member 408 includes a coupler 408B that effects coupling of the valve member 408 to the housing 120 while the change in condition is effected. In some embodiments, for example, the coupler 408B is threaded to the housing 120. In those embodiments where the valve member 408 includes a coupler 408B, in some of these embodiments, for example, the valve member 408 and the actuator 402 are defined by an exploding bolt 414, such that the exploding bolt 414 is threaded to the housing 120. In some embodiments, for example, the squib is integrated into the bolt 414.

In some embodiments, for example, the flow control apparatus 115A further includes first and second chambers (only the first chamber 312 is shown). The first chamber 312 is disposed in flow communication with the fluid responsive surface 140 for receiving pressurized fluid (e.g. liquid) from the housing passage 125, and the second chamber is configured for containing a fluid (e.g. liquid) and disposed relative to the flow control member 114 such that fluid (e.g. liquid) contained within the second chamber opposes the displacement of the flow control apparatus 115A that is being urged by pressurized fluid (e.g. liquid) within the first chamber 312, and the displacement of the flow control member 114 is effected when the force imparted to the flow control member 114 by the pressurized fluid within the first chamber 312 exceeds the force imparted to the flow control member by the fluid (e.g. liquid) within the second chamber 314. In some embodiments, for example, the displacement of the flow control member 114 is effected when the pressure imparted to the flow control member 114 by the pressurized fluid (e.g. liquid) within the first chamber 312 exceeds the pressure imparted to the flow control member by the fluid (e.g. liquid) within the second chamber 314. In some embodiments, for example, the fluid within the second chamber 314 is disposed at about atmospheric pressure.

In some embodiments, for example, both of the first and second chambers are defined by respective spaces interposed between the housing 120 and the flow control member 114, and a chamber sealing member is also included for effecting a sealed interface between the first and second chambers while the flow control member 114 is being displaced to effect the opening of the one or more ports 118.

In some embodiments, for example, leakage of fluid (e.g. liquid) from the housing passage 125 to the first chamber 312 may inadvertently occur, accumulate within the first chamber 312, and, if the first chamber 312 becomes sufficiently pressurized with the accumulated leaked fluid, the flow control member 314 could be inadvertently displaced and thereby effect inadvertent opening of the one or more ports 118. If that happens, this could compromise the ability to stimulate zones within the formation that are disposed downhole relative to the flow communication station 115 whose one or more ports 118 have been inadvertently opened in response to the fluid leakage.

Figure 19:
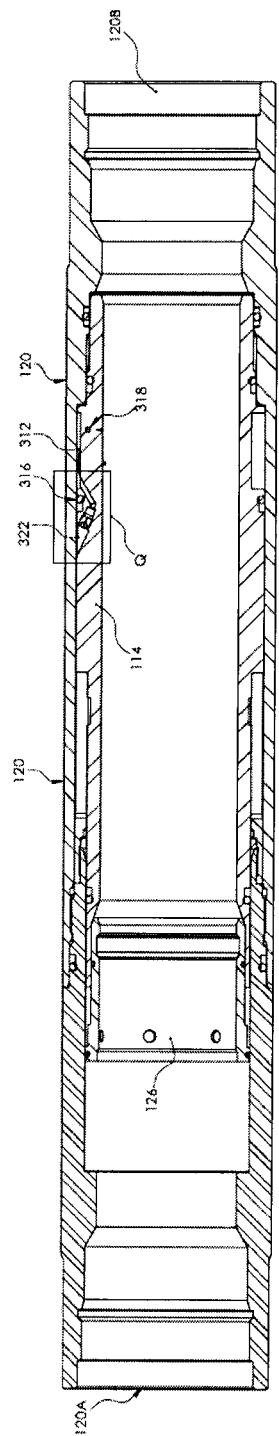
FIG. 19 is another side sectional view of the flow control apparatus illustrated in FIG. 8, illustrating the ports in the closed condition, and also illustrating the bleed passage.
Figure 20:
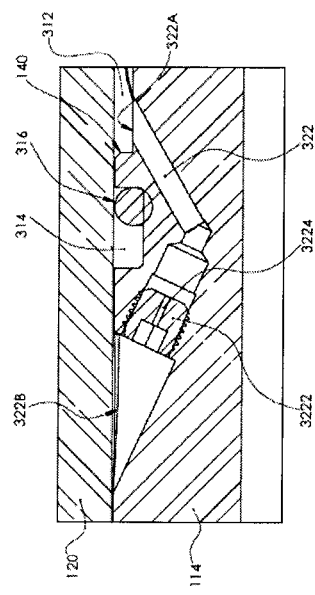
FIG. 20 is an enlarged view of Detail "Q" in FIG. 19, illustrating details of the bleed passage.

In this respect, to mitigate such inadvertent opening, a bleed passage 322 is provided and disposed in flow communication with the first chamber 312 for effecting discharge of fluid from the first chamber 312 (see FIGS. 19 and 20). The bleed passage 322 is sized to effect discharging of fluid that has leaked into the first chamber 312 from the housing passage 125, with effect that the leaked fluid is discharged at a sufficient rate such that the leaked fluid is unable to sufficiently accumulate within the first chamber 312, and pressurize the first chamber 312, to effect the inadvertent displacement of the flow control member, and lead to the inadvertent opening of the one or more ports 118. Co-operatively, the bleed passage 312 is also sized so that discharging, via the bleed passage 312, of fluid, that has accumulated within the first chamber 312 in response to the defeating of the sealed interface 304 (such as, for example, the defeating of the sealed interface that is effected directly or indirectly, in response to the sensing of an actuating signal by the sensor 150), is insufficient to prevent the accumulated fluid from becoming disposed at a sufficient pressure to act on the fluid pressure responsive surface 140 with effect that the flow control member is displaced, relative to the port, for effecting opening of the one or more ports 118. An example of the defeating of the sealed interface, that is effected directly in response to the sensing of an actuating signal, is the defeating of the sealed interface 306 by the flow communication actuator 302, upon the flow communication actuator 302 being actuated in response to the sensing of an actuating signal by the sensor 150, such as, for example, in the embodiment illustrated in FIGS. 21 and 22. An example of the defeating of the sealed interface, that is effected directly in response to the sensing of an actuating signal, is the defeating of the sealed interface 406 by pressurized fluid that is being communicated to the sealed interface-conditioning actuator 402 that has become disposed in the defeatable condition in response to the sensing of an actuating signal by the sensor 150, such as, for example, in the embodiment illustrated in FIGS. 23 and 24.

The bleed passage 322 includes an inlet 322A and an outlet 322B. In some embodiments, the discharging is to the second chamber 314. In some embodiments, for example, an insert 3222 is disposed within the bleed passage 222, and the insert includes an insert passage 3224 for defining the minimum cross-sectional area within the bleed passage 322. In some embodiments, for example, the ratio of the minimum cross-sectional area of the flow communication passage 310 to the minimum cross-section area of the bleed passage 322 is at least about 1.5, such as, for example, at least about 2. In some embodiments, for example, the ratio of the minimum cross-sectional area of the flow communication passage 310 to the minimum cross-section area of the bleed passage 322 is between about 1.5 and about 2. In some embodiments, for example, the minimum cross-sectional area of the bleed passage 322 is at least about 0.0001917 square inches, such as, for example, between about 0.0001917 square inches and about 0.0007668 square inches. In some embodiments, the minimum diameter of the bleed passage 322 is at least about 1/64 of an inch, such as, for example, between about 1/64 of an inch and 4/64 of an inch. In some embodiments, the minimum diameter of the bleed passage 322 is about 2/64 of an inch.

The bleed passage 322 and the flow communication passage 310 are co-operatively configured such that while the first sealed interface 304 is defeated such that flow communication between the housing passage 225 and the first chamber 312, via the fluid communicating passage 310, is established, and fluid (e.g. liquid) being conducted through the housing passage 125 is communicated to the first chamber 312, discharging, via the bleed passage 322, of the communicated fluid (e.g. liquid) that has accumulated within the first chamber 312, is insufficient to prevent the accumulated fluid from becoming disposed at a sufficient pressure to act on the fluid pressure responsive surface 140 with effect that the flow control member 114 is displaced, relative to the one or more ports 118, for effecting opening of the one or more ports 118.

In some embodiments, for example, the bleed passage 322 and the flow communication passage 310 are also co-operatively configured such that:

while: (i) the fluid is leaking from the housing passage 125 and into the first chamber 312, and (ii) there is an absence of a defeating of the sealed interface, the fluid (e.g. liquid) in the first chamber 312 is discharged at a sufficient rate by the bleed passage 322 such that the fluid (e.g. liquid) within the first chamber 312 is disposed at an insufficient pressure to act on the fluid pressure responsive surface 140, such that the flow control member 114 remains disposed in the closed position.

In some embodiments, for example, the leakage is effected through any one of one or more sealing interfaces that are defined between the flow control member 114 and the housing 120.

In some embodiments, for example, the leakage is effected via the flow communication passage 310.

In some embodiments, for example, the leakage is effected via a leakage-susceptible passage 318. In this respect, in some embodiments, for example, (i) a leakage-susceptible passage 318 is disposed between the housing passage 125 and the first chamber 312, (ii) a second sealed interface 320 is effecting sealing of the leakage-susceptible passage 318, and (iii) the leakage of fluid (e.g. liquid) from the fluid passage 125 to the first chamber 312 may be occurring via the leakage-susceptible passage 318.

In some embodiments, for example, the sensor 150 is disposed within the leakage-susceptible passage 318 and extends into the housing passage 225 for monitoring for, and sensing, the SID being transmitted via the wellbore 102. Suitable sealing material is disposed about the sensor 150 for establishing the second sealed interface 320. In some embodiments, for example, the second sealed interface 320 is established by a metal to metal seal between the sensor 150 and the flow control member 114 through which the sensor 115 extends.

In some embodiments, for example, a sealing member, such as an o-ring, is disposed within the leakage-susceptible passage 318 for establishing the second sealed interface 230 between the flow control member 114 and the housing 120.

The first chamber 312, the leakage-susceptible passage 318, and the housing passage 125 are co-operatively configured such that, while fluid (e.g. liquid) that is being conducted through the housing passage 125 is leaking though the leakage-susceptible passage 318, the leaking fluid is communicated to the first chamber 312.

The bleed passage 322, the flow communication passage 310, and the leakage-susceptible passage 318 are co-operatively configured such that:

while the first sealed interface 304 is defeated such that flow communication between the housing passage 225 and the first chamber 312, via the fluid communicating passage 310, is established, and fluid (e.g. liquid) being conducted through the housing passage 125 is communicated to the first chamber 312, the communicated fluid is accumulated within the first chamber 312 such that the fluid (e.g. liquid) within the first chamber 312 is disposed at a sufficient pressure to act on the fluid pressure responsive surface 140 with effect that the flow control member 114 is displaced, relative to the one or more ports 118, for effecting opening of the one or more ports 118; and while: (i) fluid (e.g. liquid) is being conducted through the housing passage 125, (ii) the conducted fluid is leaking though the leakage-susceptible passage 318 and communicated to the first chamber 312, and (iii) the first sealed interface 304 is sealing flow communication between the housing passage 125 and the first chamber 312 via the flow communication passage 310, the fluid (e.g. liquid) in the first chamber 312 is discharged at a sufficient rate by the bleed passage 322 such that fluid (e.g. liquid) within the first chamber 312 is disposed at an insufficient pressure to act on the fluid pressure responsive surface 140, with effect that the flow control member 114 remains disposed in the closed position.

In those embodiments where a plurality of flow communication stations 115 are integrated into the wellbore string 116, and each one of the flow communication stations 115, independently, includes a respective flow control apparatus 115A, where the flow control apparatus 115 is configured such that the seating surface 128A, once obtained, is disposed uphole of the one or more of the ports 118, and it is desired to stimulate a zone within the subterranean formation via a one of the flow communication station (the "uphole flow communication station 115") immediately uphole relative to another one of the flow communication stations (the "downhole flow communication station 115"), where a flow communication-interference body is seated on the seating surface associated with the downhole one of the flow communication, the portion of the wellbore that is downhole of the seating surface 128A, and is typically disposed in flow communication with the subterranean formation via previously opened ports of downhole-disposed flow communication stations, is isolated from the portion of the wellbore that is uphole of the seating surface 128A. In this respect, the uphole wellbore is sometimes referred to as a "quiet wellbore", due to this isolation. In quiet wellbores, transmission of pressure signals is relatively reliable for triggering the above-described displacement of the flow control member 114.

On the other hand, where the flow control apparatus 115 is configured such that the seating surface 128A, once obtained, is disposed downhole relative to the one or more of the ports 118, a signal being transmitted for triggering the above-described displacement of the flow control member 114, under these circumstances, may not be being transmitted through a quiet wellbore, where downhole zones have been previously stimulated. This is because such zones may not be isolated from an uphole flow communication station 115 to which it is desired to transmit the signal. In these circumstances, relatively larger pumps are required to deliver a pressure signal, such as in the form of one or more pulses, in order reliably trigger the above-described displacement of the flow control member 114.

Figure 27:
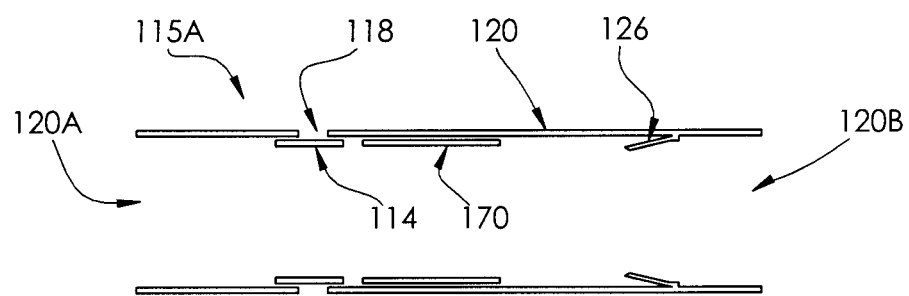
FIG. 27 is a side sectional view of another embodiment of a flow control apparatus for use in the system illustrated in FIG. 1, illustrating the ports in the closed condition and with the body disposed in a non-actuated condition and spaced apart from the co-operating member.
Figure 28:
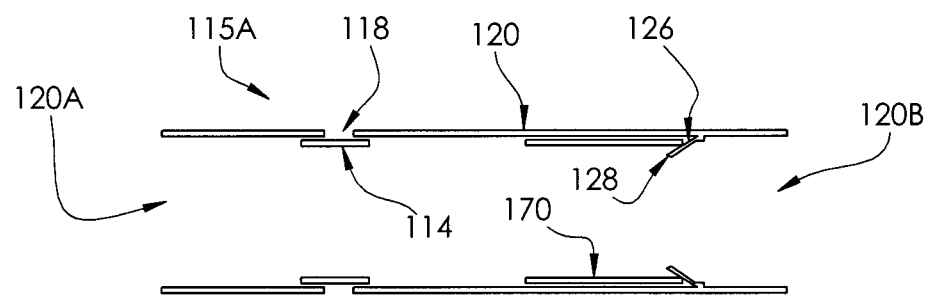
FIG. 28 is a side sectional view of the flow control apparatus illustrated in FIG. 27, illustrating the ports in the closed condition, and with the body having been displaced and having effected deformation of a co-operating member obtain a seating surface for receiving a ball.
Figure 29:
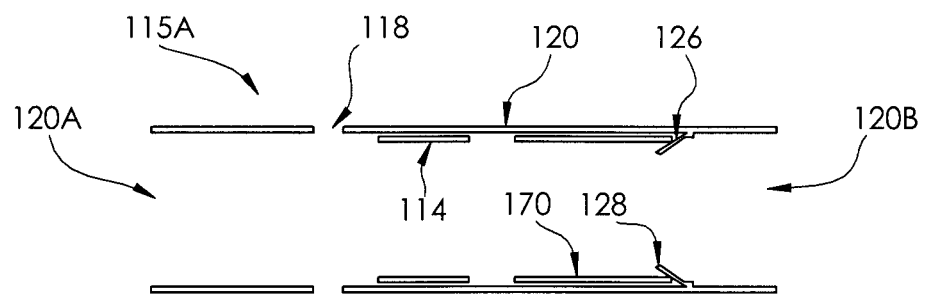
FIG. 29 is a side sectional view of the flow control apparatus illustrated in FIG. 27, illustrating the ports in the open condition, with the flow control member having been displaced relative to the ports.

Referring to FIGS. 27 to 29, in some embodiments, for example, the deformation is effected in response to contact engagement between a moveable actuator 170 (for example, in the form of a sleeve), separate from the flow control member 114, and the co-operating member 126, in response to movement of the actuator 170. The movement of the actuator 170 can be effected mechanically or hydraulically. Such movement can be triggered in response to receiving of a signal transmitted from the surface, as in the case for some of the embodiments of the flow control member 114, as described above. In some embodiments, for example, the movement of the actuator 170 is in the downhole direction, such that the obtained seating surface 128A is disposed downhole relate to the one or more ports (see FIG. 28). After the obtaining of the seating surface 128A, the flow control member 114 is displaced relative to the one or more ports 118, in a downhole direction, such that opening of the one or more ports 118 is effected (see FIG. 29). After the opening of the one or more ports 188, but prior to stimulation of the subterranean formation via the opened ports 118, to effect isolation of the downhole-disposed flow communication station 115, and thereby create conditions to facilitate stimulation via the opened one or more ports, a flow communication interference body 130 is deployed within the wellbore such that the body 130 becomes seated on the obtained seating surface 128A.

In some embodiments, for example, there is provided a kit, including a plurality of flow control apparatuses 115A and a plurality of flow communication-interference bodies 130. Each one of the plurality of flow communication-interference bodies 130, independently, is, for all of the plurality of flow control apparatuses 115A, suitable for seating on the seating surface 128A that is obtainable, by the deformation of a portion of the flow control member 114 effected by the deformation-effecting member 126 while the flow control member 114 is being displaced relative to the one or more ports 118 (i.e. each one of the plurality of flow communication-interference bodies 130, independently, is suitable for seating on the seating surface 128A while the flow control member 114 is disposed in the interference body-receiving condition). As well, each one of the plurality of flow communication-interference bodies 130, independently, is, for all of the plurality of flow control apparatuses 115A, and while there is an absence of an obtained seating surface 128A (i.e. the flow communication station 115 is disposed in a "passive condition"). In some embodiments, for example, the plurality of flow communication-interference bodies 130 are of the same, or substantially the same, geometry. In some embodiments, for example, the plurality of flow communication-interference bodies 130 are of the same, or substantially the same, size.

In this respect, and extrapolating this concept further, many more flow communication stations 115 could be integrated within the wellbore string 116 to enable stimulation and production from many more stages within the subterranean formation 100. Notably, for each one of the stages, because isolation of the stage is not premised on the seating of a body 130 of a different geometry than for the other ones of the stages, the number of stages from which production can be realized is not limited by size constraints.

An exemplary process for stimulating production of hydrocarbon material from a subterranean formation 100 via a wellbore material transfer system 104 including three or more flow communication stations 1115, 2115, and 3115, where each one of the two flow communication stations that are the ones that are disposed furthest downhole (i.e. flow communication station 1115, and 2115), independently, is a flow communication station 115 and includes a flow control apparatus 115A that is configured in accordance with any one of the above-described embodiments, will now be described. The third flow communication station 3115 can be, optionally, a flow communication station 115, but does not necessarily need to be configured to obtain a seating surface 128A by a deformation effected during displacement of the flow control member 114 from the closed position to the open position. The description which follows is with reference to embodiments where the number of flow communication stations is three (3), and is defined by a first flow communication station 1115, a second flow communication station 2115, and a third flow communication station 3115. It is understood that the number of flow communication stations 115 is not limited to three (2) and may be any number of flow communication stations 115.

Each one of the first and second flow communication stations, independently, includes the flow control apparatus 115A. A flow communication-interference body 1130 is provided for seating on the seating surface 128A that is obtainable, for the flow control apparatus 115A of the flow communications station 1115, by the deformation of a portion of one of the flow control member 114 (see embodiments illustrated in FIGS. 2 to 4) and the co-operating member (see embodiments illustrated in FIGS. 5 to 7, and FIGS. 8 to 20) effected while the flow control member 114 is being displaced relative to the one or more ports 118. A flow communication-interference body 2130 is provided for seating on the seating surface 128A that is obtainable, for the flow control apparatus 115A of the flow communications station 2115, by the deformation of a portion of one of the flow control member 114 (see embodiments illustrated in FIGS. 2 to 4) and the co-operating member (see embodiments illustrated in FIGS. 5 to 7, and FIGS. 8 to 20) effected while the flow control member 114 is being displaced relative to the one or more ports 118. The flow communication-interference body 2130 is also configured for seating on the seating surface 128A associated with the flow communication station 1115 while the flow control apparatus 115A of the flow communication station 1115 is disposed in the interference body-receiving condition, and the flow communication-interference body 1130 is also configured for seating on the seating surface 128A associated with the flow communication station 2115 while the flow control apparatus 115A of the flow communication station 2115 is disposed in the interference body-receiving condition (i.e. the bodies 1130 and 2130 are interchangeable). As well, while the flow communication station 1115 is disposed in the passive condition, each one of the bodies 1130, 2130, independently, is conductible through the housing passage 125 (from the inlet 120A to the outlet 120B). Likewise, while the flow communication station 2115 is disposed in the passive condition, each one of the bodies 1130, 2130, independently, is conductible through the housing passage 125 (from the inlet 120A to the outlet 120B). Of course, to enable seating on the seating surfaces 128 associated with the stations 1115, 2115, the third flow communication station must be configured to permit passage of each one of the bodies 1130, 2130, independently, as required.

The flow control member 114 of the first flow communication station 1115 is displaced uphole, effecting opening of the one or more ports 118 associated with the first flow communication station 1115. The act of displacement effects the deformation of a portion of one of the flow control member 114 (see embodiments illustrated in FIGS. 2 to 4) and the co-operating member (see embodiments illustrated in FIGS. 5 to 7, and FIGS. 8 to 20) such that a change in condition of first flow communication station 1115, from the passive condition to the interference body-receiving condition, is effected. Stimulation fluid is supplied from the surface, conducted through the wellbore string 116 and into the subterranean formation via the opened one or more ports 118 associated with the first flow communication station 1115, thereby effecting stimulation of a first stage. After completion of the stimulation of the first stage, the flow communication-interference body 1130 is deployed downhole and becomes seated on the seating surface 128A that has been formed by the above-described deformation, thereby effecting isolation of the one or more ports 118 of the flow communication station 1115 from the uphole flow communication stations 2115 and 3115. In doing so, the flow communication body 1130 passes through the flow communication stations 2115 and 3115, before landing on the seating surface 128A. After the body 1130 has become seated on the seating surface 128A associated with the first flow communication station 1115, the flow control member 114 of the second flow communication station 2115 is displaced uphole, effecting opening of the one or more ports 118 associated with the second flow communication station 2115. The act of displacement effects the deformation of a portion of one of the flow control member 114 (see embodiments illustrated in FIGS. 2 to 4) and the co-operating member (see embodiments illustrated in FIGS. 5 to 7, and FIGS. 8 to 20) such that a change in condition of the second flow communication station 2115, from the passive condition to the interference body-receiving condition, is effected. Stimulation fluid is supplied from the surface, conducted through the wellbore string 116 and into the subterranean formation via the opened one or more opened ports 118 associated with the second flow communication station 2115, thereby effecting stimulation of a second stage. After completion of the stimulation of the second stage, the flow communication-interference body 1130 is deployed downhole and becomes seated on the seating surface 128A that has been formed by the above-described deformation, thereby effecting isolation of the one or more ports 118 of the flow communication station 2115 from the uphole flow communication station 3115, and thereby enabling stimulation of a third stage via the third flow communication station 3115.

As alluded to above, in some embodiments, for example, the displacement of the flow control member 114 from the closed position to the open position is effected in response to urging by fluid pressure that is communicated from the housing passage 125 to a fluid responsive surface 140 of the flow control member 114. In some of these embodiments, for example, a sealed interface is disposed between the housing passage 125 and the fluid responsive surface 140, and the sealed interface effects sealing, or substantial sealing, of fluid pressure communication between the housing passage 125 and the fluid responsive surface 140. The fluid pressure communication between the housing passage 125 and the fluid responsive surface 140 (for effecting the displacement of the flow control member 114 from the closed position to the open position) is established in response to defeating of the sealed interface. The defeating of the sealed interface can be effected directly or indirectly in response to sensing of a downhole-communicated signal by a sensor 150. In this respect, in some embodiments, for example, in effecting the displacement of the flow control member 114 of the first flow communication station 1115, defeating of a sealed interface is effected in response to sensing of a downhole-communicated signal by a sensor 150 of the first flow communication station 1115, and in effecting the displacement of the flow control member 114 of the second flow communication station 2115, defeating of a sealed interface is effected in response to sensing of a downhole-communicated signal by a sensor 150 of the second flow communication station 2115. In some embodiments, for example, the downhole-communicated signal that effects the defeating of the sealed interface, and thereby establishes fluid pressure communication between the housing passage 125 and the fluid responsive surface 140 for effecting the displacement of the flow control member 114 from the closed position to the open position, is the same signal for each one of the flow communication stations 1115, 2115, such that opening of both of the flow communication stations 1115, 2115, and formation of the seating surfaces 128A associated with such opening, is effected by the same signal. In this respect, the flow communication-interference body 1130, that is designed to seat on the seating surface 128A of the flow communication station 1115, is additionally configured to be conducted past the seating surface 128A of the flow communication station 2115 in order to reach the seating surface 128A of the flow communication station 1115. Alternatively, in some embodiments, for example, the downhole-communicated signal that effects the defeating of the sealed interface, and thereby establishes fluid pressure communication between the housing passage 125 and the fluid responsive surface 140 for effecting the displacement of the flow control member 114 from the closed position to the open position, is unique for each one of the flow communication stations 1115, 2115, such that each one of the flow communication stations 1115, 2115 is configured to open independently of the other one of the flow communication stations 115, 2115.

After all of the stages have been stimulated, to enable production, the isolation effected by the bodies 1130, 2130 is defeated. In this respect, in some embodiments, for example, the bodies 1130, 2130 are unseated, such as, for example, by effecting a pressure reduction within the wellbore. In some embodiments, for example, the pressure reduction, additionally effects flowback of the bodies 1130, 2130. In some embodiments, for example, the defeating of the isolation is effected after the bodies 1130, 2130 have been seated on their corresponding seating surfaces 128 for a sufficient time in contact with wellbore fluids within the wellbore 102 such that a change in condition of the bodies 1130, 2130 is effected (in response to the contacting with the wellbore fluids) such that a fluid passage is established within the bodies 1130, 2130 such that flow communication is effected between the surface and the subterranean formation via the one or more ports 118. In some of these embodiments, for example, for each one of the bodies 1130, 2103, independently, at least a portion of the body 1130 (2130) is dissolvable in wellbore fluids within the wellbore 102 and, in this respect, the change in condition includes dissolution of at least a portion of the body 1130 (2130) such that the flow communication becomes established.

In the above description, for purposes of explanation, numerous details are set forth in order to provide a thorough understanding of the present disclosure. However, it will be apparent to one skilled in the art that these specific details are not required in order to practice the present disclosure. Although certain dimensions and materials are described for implementing the disclosed example embodiments, other suitable dimensions and/or materials may be used within the scope of this disclosure. All such modifications and variations, including all suitable current and future changes in technology, are believed to be within the sphere and scope of the present disclosure. All references mentioned are hereby incorporated by reference in their entirety.

The invention claimed is:

1. A flow control apparatus comprising:
a housing including a port, an inlet, and an outlet;
a housing passage disposed within the housing for effecting flow communication between the inlet, the outlet, and the port;
a flow control member, displaceable, relative to the port, for effecting opening of the port; and
a co-operating member co-operatively configured with the flow control member such that displacement of the flow control member, relative to the port, is with effect that a force is applied by the flow control member to the co-operating member, with effect that a seating surface is obtained for receiving a flow communication interference body, that is being conducted through the housing passage, in a seated condition; and
the seating surface and the port are co-operatively configured such that seating of a flow communication interference body on the seating surface effects occlusion of the housing passage for obstructing flow communication between the housing inlet and the port.

2. The flow control apparatus as claimed in claim 1;
wherein the co-operative configuration is such that the applied force is effected by contact engagement between the flow control member and the co-operating member.

3. The flow control apparatus as claimed in claim 1;
wherein:
the flow control member and the housing are co-operatively configured such that, after the seating surface is obtained, the flow control member is retained, relative to the housing, such that displacement of the flow control member, for effecting closure of the port, is prevented or substantially prevented.

4. The flow control apparatus as claimed in claim 1;
wherein the seating surface is obtained in response to deformation, of one of the flow control member and the co-operating member, that is effected by contact engagement between the flow control member and the co-operating member.

5. The flow control apparatus as claimed in claim 4;
wherein:
the housing passage includes a pre-deformation minimum cross-sectional area;
the deformation is with effect that the minimum cross-sectional area of the housing passage is reduced such that the housing passage includes a post-deformation minimum cross-sectional area; and
the ratio of the post-deformation minimum cross-sectional area to the pre-deformation minimum cross-sectional area is between 0.7 and 0.98.

6. The flow control apparatus as claimed in claim 5;
wherein the post-deformation minimum cross-sectional area is defined at the obtained seat.

7. The flow control apparatus as claimed in claim 4;
wherein:
the one of the flow control member and the co-operating member is the flow control member, such that the deformation that is effected is that of the flow control member; and
the co-operating member is stationary, or substantially stationary, relative to the flow control member while the flow control member is being displaced relative to the port.

8. The flow control apparatus as claimed in claim 7;
wherein the co-operating member extends from an internal surface of the housing and into the housing passage.

9. The flow control apparatus as claimed in claim 1;
wherein:
the deformation of the one of the flow control member and the co-operating member is of a deformable portion;
the deformable portion includes a seating surface precursor, wherein the deformation of the deformable portion is such that the seating surface precursor is converted to the seating surface; and
wherein the seating surface precursor is characterized by an elongation to failure of greater than about 5%.

10. The flow control apparatus as claimed in claim 1;
wherein:
the displacement of the flow control member includes displacement along a path; and
the co-operating member is disposed within the path for interfering with the displacement of the flow control member with effect that the seating surface is obtained in response to the interference.

11. The flow control apparatus as claimed in claim 1;
wherein:
the obtaining of the seating surface effects a change in condition of the flow control apparatus to a flow communication interference body-receiving condition;
the flow control member and the housing are co-operatively configured such that the flow control member is sealingly engaged to the housing at least while the flow control apparatus is disposed in the flow communication interference body-receiving condition and while a flow communication interference body is seated against the seating surface, a sealing interface is obtained with effect that:
(i) flow communication between the housing inlet and the housing outlet, via the housing passage, is sealed or substantially sealed; and
(ii) flow communication between the housing inlet and the port, via the housing passage, is sealed or substantially sealed.

12. The flow control apparatus as claimed in claim 1;
wherein:
the housing further includes a stop;
the flow control member is displaceable from a closed position to an open position for effecting the opening of the port;
the housing, the flow control member, and the co-operating member are co-operatively configured such that:
while the flow control member is disposed in the closed position:
the flow control member is releasably retained relative to the co-operating member such that the co-operating member is translatable with the flow control member;
a deformation-urging portion of the flow control member is spaced-apart from a deformable portion of the co-operating member; and
the co-operating member is spaced apart from the stop;
and
during a displacement of the flow control member, relative to the port, from the closed position, that effects opening of the port:
the co-operating member becomes disposed relative to the stop with effect that translation of the co-operating member, with the flow control member, becomes opposed; and
after the co-operating member becomes disposed relative to the stop with effect that the translation of the co-operating member, with the flow control member, becomes opposed, the flow control member becomes released from the retention relative to the co-operating member and is displaced, relative to the co-operating member, with effect that deformation of the deformable portion by the deformation-urging portion is effected.

13. The flow control apparatus as claimed in claim 12;
wherein the housing, the flow control member, and the co-operating member are further co-operatively configured such that, while the deformation-urging portion of the flow control member is spaced-apart from the deformable portion of the co-operating member; a receiving space is defined between the housing, the flow control member and the co-operating member, and is disposed for receiving the flow control member in response to displacement of the flow control member relative to the co-operating member, and cement retardant is disposed within the receiving space; and
while the receiving space is receiving the flow control member in response to displacement of the flow control member relative to the co-operating member, the cement retardant is displaced from the receiving space.

14. The flow control apparatus as claimed in claim 13, further comprising:
a plug for retaining the cement retardant within the receiving space.

15. The flow control apparatus as claimed in claim 14;
wherein the housing, the flow control member, and the co-operating member are further co-operatively configured such that, while the receiving space is receiving the flow control member in response to displacement of the flow control member relative to the co-operating member, a change in condition is effected to the plug such that retention of the cement retardant within the receiving space, by the plug, is defeated.

16. The flow control apparatus as claimed in claim 13;
wherein the releasable retention of the flow control member to the co-operating member is effected by a frangible member.

17. The flow control apparatus as claimed in claim 1;
wherein the flow control member includes a sliding sleeve.

18. The flow control apparatus as claimed in claim 1;
wherein the deformation is a plastic deformation.

19. The flow control apparatus as claimed in claim 1;
wherein the flow control member and the co-operating member are co-operatively configured such that the obtained seating surface is effective for maintaining the flow communication-interference body in the seated condition while a differential pressure of at least 500 psi is applied across the seat for at least five minutes.

20. The flow control apparatus as claimed in claim 1;
wherein the obtained seating surface is disposed uphole of the port.

21. A flow control apparatus comprising:
a housing including an inlet and a port
a housing passage disposed within the housing;
a flow control member, displaceable, relative to the port, from a closed position to an open position, wherein, in the closed position, the flow control member covers the port, and in the open position, the flow control member is disposed relative to the port such that the port is uncovered;
a plurality of support members extending from the flow control member in an outwardly direction relative to the central longitudinal axis of the housing passage, wherein each one of the support members, independently, includes a respective support surface;
wherein:
the housing includes a first housing portion and a second housing portion, wherein the first housing portion partially overlaps with the second housing portion;
the first housing portion includes:
an inner surface; and
an external surface disposed, relative to the inner surface, on an opposite side of the first housing portion for communicating with a subterranean formation;
the second housing portion defines a plurality of receiving spaces, wherein each receiving space, independently, is configured to receive a respective one of the plurality of support members;
the first housing portion, the second housing portion, the flow control member and the one or more ports are co-operatively configured such that:
at least a portion of the second housing portion is opposing a first portion of the inner surface of the first housing portion; and
at least while the flow control member is disposed in the closed position, for each one of the support members, independently, the respective support surface is opposing a second portion of the inner surface of the first housing portion;
and
the support members and the second housing portion being co-operatively configured such that the displacement of the flow control member from the closed position to the open position is with effect that each one of the plurality of supporting members, independently, is received within a corresponding one of the plurality of receiving spaces.

22. The flow control apparatus as claimed in claim 21;
wherein the displaceability of the flow control member, from the closed position to the open position, is along an axis that is parallel to, or substantially parallel to, the central longitudinal axis of the housing passage.

23. The flow control apparatus as claimed in claim 21;
wherein the plurality of support members is circumferentially spaced apart from each other.

24. The flow control apparatus as claimed in claim 21;
wherein, at least while the flow control member is disposed in the closed position, each one of the support members, independently, is spaced apart from the first housing portion by a minimum distance of less than about $12/1000$ of an inch.

25. The flow control apparatus as claimed in claim 21;
wherein:
for at least one of the plurality of first support members, independently, the ratio of (a) the thickness of the respective support surface of the first support member to (b) the thickness of an opposed portion of the first housing portion that is being opposed by the respective support surface of the first support member is at least about 0.75:1.

26. The flow control apparatus as claimed in claim 21, further comprising:
a chamber disposed within the housing between a first sealed interface and a second sealed interface;
wherein:
the first sealed interface is defined between the first housing portion and the flow control member;
the second sealed interface is defined between the first housing portion and the second housing portion; and
the chamber is disposed in fluid pressure communication with at least the first and second portions of the inner surface of the first housing portion.

27. The flow control apparatus as claimed in claim 26;
wherein the chamber is disposed at about atmospheric pressure.

28. The flow control apparatus as claimed in claim 26;
wherein the displaceability of the flow control member is along a displacement axis that is parallel, or substantially parallel, to the central longitudinal axis of the housing passage, and the displacement of the flow control member, from the closed position to the open position, is over a distance of at least 0.25 inches along the displacement axis.

29. A flow control apparatus comprising:
a housing including a port;
a housing passage disposed within the housing;
a flow control member that is displaceable relative to the port and includes a fluid responsive surface;
an actuating fluid communicating passage;
a sealed interface effecting sealing of the actuating fluid communicating passage;
a compartment disposed relative to the fluid responsive surface such that, while fluid is disposed within the compartment, fluid pressure is applied to the fluid responsive surface by fluid disposed within the compartment;
a bleed passage disposed in flow communication with the compartment for effecting discharge of fluid from the compartment;
wherein:
while the sealed interface is effecting sealing of the actuating fluid communicating passage, the compartment and the bleed passage are co-operatively configured such that discharging, via the bleed passage, of leaked fluid from the housing passage, that has accumulated within the compartment, is effective to prevent the accumulated fluid from becoming disposed at a sufficient pressure to act on the fluid pressure responsive surface, such that displacement of the flow control member, relative to the port, for effecting opening of the port, is absent;
the compartment, the actuating fluid communicating passage, and the housing passage are co-operatively configured such that defeating of the sealed interface is with effect that flow communication between the housing passage and the compartment, via the actuating fluid communicating passage, is established, and fluid disposed within the housing passage is communicated to the compartment; and
the bleed passage and the actuating fluid communicating passage are co-operatively configured such that while the sealed interface is defeated such that flow communication between the housing passage and the compartment, via the actuating fluid passage, is established, and fluid disposed within the housing passage is communicated to the compartment, discharging, via the bleed passage, of the communicated fluid, that has accumulated within the compartment, is ineffective to prevent the accumulated fluid from becoming disposed at a sufficient pressure to act on the fluid pressure responsive surface with effect that the flow control member is displaced, relative to the port, for effecting opening of the port.

30. The flow control apparatus as claimed in claim 29;
wherein the bleed passage and the actuating fluid communicating passage are also co-operatively configured such that:
while: (i) the fluid is leaking from the housing passage and into the compartment, and (ii) there is an absence of a defeating of the sealed interface, the fluid in the first compartment is discharged at a sufficient rate via the bleed passage such that the fluid within the compartment is disposed at an insufficient pressure to act on the fluid pressure responsive surface, such that the flow control member remains disposed in the closed position.

31. The flow control apparatus as claimed in claim 29;
wherein the ratio of the minimum cross-sectional area of the actuating fluid communicating passage to the minimum cross-section area of the bleed passage is at least about 1.5.

32. The flow control apparatus as claimed in claim 29;
wherein the ratio of the minimum cross-sectional area of the bleed passage is at least about 0.0001917 square inches.

33. The flow control apparatus as claimed in claim 29;
wherein the minimum diameter of the bleed passage is at least about $1/64$ of an inch.

34. The flow control apparatus as claimed in claim 29, further comprising an insert disposed within the bleed passage, wherein the insert includes an insert passage for defining the minimum cross-sectional area within the bleed passage.

* * * * *